(12) United States Patent
Mori et al.

(10) Patent No.: US 7,076,863 B2
(45) Date of Patent: Jul. 18, 2006

(54) APPARATUS FOR FOLDING FLAT CABLE

(75) Inventors: Isao Mori, Yokkaichi (JP); Masanori Kato, Yokkaichi (JP); Hiroshi Adachi, Yokkaichi (JP); Kunihiro Mizui, Yokkaichi (JP); Takashi Ueno, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 486 days.

(21) Appl. No.: 10/373,071

(22) Filed: Feb. 26, 2003

(65) Prior Publication Data
US 2004/0000424 A1    Jan. 1, 2004

(30) Foreign Application Priority Data

| May 14, 2002 | (JP) | ............................. 2002-138912 |
| May 22, 2002 | (JP) | ............................. 2002-148007 |
| Jun. 5, 2002 | (JP) | ............................. 2002-164110 |

(51) Int. Cl.
*B23P 19/00* (2006.01)
(52) U.S. Cl. .............................. 29/748; 29/747; 29/755
(58) Field of Classification Search ................ 29/33 F, 29/34 D, 745, 755, 33 P, 747, 748
See application file for complete search history.

(56) References Cited

U.S. PATENT DOCUMENTS

| 4,065,199 | A | * | 12/1977 | Andre et al. ................. 439/498 |
| 4,429,939 | A | * | 2/1984 | Piasecki ...................... 439/442 |
| 4,845,315 | A | * | 7/1989 | Stopper ....................... 361/827 |
| 4,898,544 | A | * | 2/1990 | Callahan ...................... 439/498 |
| 5,562,466 | A | * | 10/1996 | Kato et al. .................. 439/164 |
| 6,631,559 | B1 | * | 10/2003 | Ueno ........................... 29/861 |
| 6,723,925 | B1 | * | 4/2004 | Ohara et al. ............. 174/113 R |

FOREIGN PATENT DOCUMENTS

JP           10321063           12/1998

OTHER PUBLICATIONS

English Language Abstract of JP 10-321063.

* cited by examiner

*Primary Examiner*—Carl J. Arbes
(74) *Attorney, Agent, or Firm*—Greenblum & Bernstein, P.L.C.

(57) ABSTRACT

A connector holder holds a connector of a flat cable. Cable-folding members are provided on an arrangement path for the flat cable having the connector. The cable-folding member is provided at each of the folding positions of the flat cable that are specified on the arrangement path. The cable-folding member includes a positioning section for disposing the flat cable on the arrangement path and a direction-defining section for specifying a folding angle of the flat cable F in association with the positioning section. A successive folding apparatus and a successive folding method can enhance accuracies in dimension and operation in a successive folding process of a flat cable F.

3 Claims, 30 Drawing Sheets

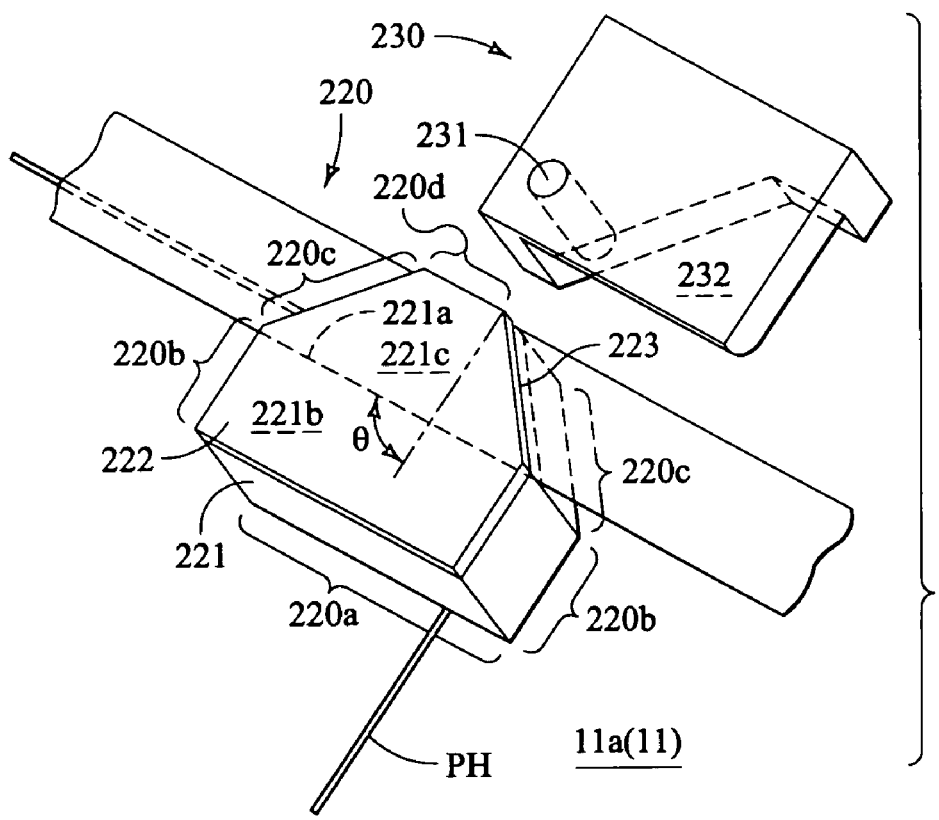
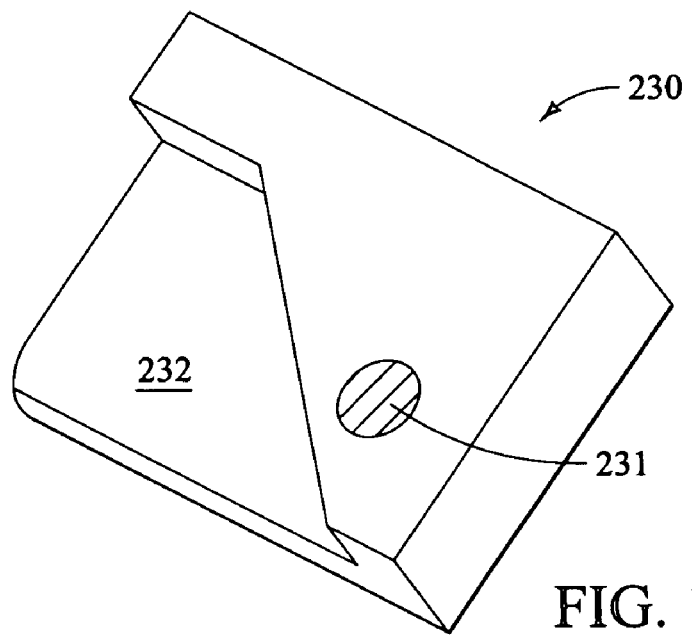
FIG. 9
FIG. 10

APPARATUS FOR FOLDING FLAT CABLE

BACKGROUND OF THE INVENTION

1. Field of the Invention

This invention relates to an apparatus and a method for folding a flat cable.

2. Description of the Related Art

In general, as disclosed by, for example, Japanese Patent Public Disclosure No. HEI 10-321063 (1998), a flat cable is a sheet-like wiring body comprising a conductive core for constituting a given circuitry and an insulation resin sheath covering the conductive core. Such flat cable is utilized as, for example, a roof harness to be arranged in a vehicle roof. The roof harness may become as large as, for example, 3000 mm in length and 1500 mm in width when the harness is developed on a drawing board. Upon producing the roof harness, a trunk line part and branch line parts are produced individually and then are assembled at the final step.

A process of producing the branch line parts includes the steps of coupling a connector to an end of a strip-like flat cable, folding a flat cable at suitable positions in accordance with a final arrangement pattern having bent paths, attaching external parts such as a clamp to the flat cable, and electrically connecting the branch line parts to the flat cable constituting a trunk line part.

In the step of folding the flat cable constituting the branch line part, an operator marks folding lines at predetermined folding positions on the flat cable and folds the flat cable along the marked lines on the flat cable on a work table such as a drawing board.

It is required to precisely maintain at least a folding angle and to enhance the efficiency of the many folding steps in a folding process of the flat cable described above.

However, in the case where the folding work is done manually in accordance with only marking lines for folding the flat cable, it will become difficult to accurately make creases on the marking lines, thereby lowering not only the accuracy of the dimensions, but also operability.

Such folding steps includes an operation of successively folding the flat cable at two adjacent positions on the flat cable. In the case of carrying out a successive folding operation, the operator folds the flat cable at a first working position in accordance with a first marking and then folds the flat cable at a second working position in accordance with a second marking.

However, in the case of manually carrying out successive folding in accordance with the markings, since it was difficult to precisely fold the flat cable at the first working position and it was necessary to fold the flat cable at the second working position near the first working position, it was more difficult to precisely fold the flat cable at the second working position in accordance with the second marking. Consequently, accuracies in dimension and working in successive folding operations will be lowered.

A crease of the flat cable formed at the first working position is unstable in position on account of a recovery force of the flat cable. Consequently, when the flat cable is folded at the second working position, the worker must make a second crease in the flat cable at the second working position while maintaining the first crease in the flat cable at the first working position. This will lower the efficiency of operation.

In the step of folding the flat cable constituting the branch line part, an operator marks folding lines at predetermined folding positions on the flat cable and folds the flat cable along the marked lines on the flat cable on a work table such as a drawing board.

SUMMARY OF THE INVENTION

In view of the above problems, an object of the present invention is to provide an apparatus and a method for folding a flat cable that can make a highly precise folding angle and carry out a folding operation efficiently.

In order to solve the above problems, the present invention is directed to an apparatus for folding a strip-like flat cable having a connector on at least an end thereof to dispose the flat cable in a given arrangement pattern. The apparatus includes a drawing board for arranging a flat cable to be processed, an arrangement path of the flat cable being set on the drawing board beforehand; a connector holder secured to the drawing board for detachably holding the connector attached to the flat cable at a connector holding-position defined on the arrangement path; and a plurality of cable-folding members secured to the drawing board at folding positions of the flat cable defined on the arrangement path, each member including a positioning section for disposing the flat cable on the arrangement path and a direction-defining section for defining a folding angle of the flat cable by defining a folding direction of the flat cable in association with the positioning section.

According to the present invention, it is possible to define the folding position of the flat cable from an end having the connector by mounting the connector on the connector holder. Then, the flat cable is disposed on the cable-folding members one after another from the connector holder on the arrangement path. While the block body of the cable-folding member defines the folding position of the flat cable, the outer sidewall defines the given folding angle when the flat cable is folded in the direction defined by the outer sidewall. Thus, it is possible according to the present invention to carry out the folding process while defining the precise folding positions and angles whether the flat cable has a marking or not. Accordingly, the invention has the advantage of eliminating the marking process.

In another aspect, the direction-defining section is formed on an outer wall of the positioning section, and the direction-defining section is a guide surface that extends in a direction intersecting a longitudinal direction of the flat cable defined by the positioning section at the folding angle and guides an edge of the folded portion of the flat cable.

In this aspect, in the case of using the cable-folding member in the first embodiment, since it is possible to define the folding angle of the flat cable by disposing the edge of the folded portion of the flat cable along the outer sidewall, it is possible to fold the flat cable without interposing any foreign substances into the folded portion. Consequently, a dimension of the folded flat cable becomes more accurate.

In still another aspect of the present invention, the present invention is directed to a method for folding a flat cable by using an apparatus for folding a flat cable, including the steps of locking detachably a connector attached to a flat cable by a connector holder; disposing the flat cable on the arrangement path so that the connector is disposed on an upstream side of the arrangement path and folding the flat cable at folding angles defined by cable-folding members while the cable-folding members detachably hold the flat cable from the upstream side of the arrangement path successively.

According to the present invention, the connector positions the end of the flat cable and the flat cable is folded successively from the upstream side of the arrangement path to set the positioned end as an upstream end. The connector holder serves as a first folding member. While the cable-folding member at the upstream side holds the flat cable, the cable-folding member at the downstream side folds the flat cable. The upstream cable-folding member defines a folding position for the downstream cable-folding member. Accordingly, the respective cable-folding members can define precise folding angles and precise positioning and folding works can be repeated through an entire length of the flat cable.

In a method for folding a flat cable, it is preferable to pinch a portion of the flat cable having a crease folded by the cable-folding member to cause plastic deformation in the crease.

Thus, since the crease of the flat cable is subject to plastic deformation, the accuracy of the finished folded cable can be greatly improved.

In still another aspect of the present invention, the present invention is directed to a cable-folding member for folding a flat cable at a given folding angle, including a direction-defining section for defining a folding direction of a flat cable; a positioning section for positioning the flat cable so that the positioning section defines a folding angle of the flat cable in association with the direction-defining section; and a cable-receiving section extending from the positioning section and having a groove for making a crease in the flat cable along a line on which the flat cable is to be folded.

According to this aspect, a suitable tool clamps the flat cable along the groove in the cable-receiving section, before the cable-folding member folds in the direction defined by the direction-defining section, thereby making the creases in the flat cable. Consequently, it is possible to easily fold the flat cable in the direction defined by the direction-defining section.

In still another aspect of the present invention, the present invention is directed to a cable-pinching member having a direction-defining section for defining a folding direction of a flat cable and a positioning section for positioning the flat cable to define a folding angle of the flat cable in association with the direction-defining section and being used together with a cable-folding member. The cable-pinching member moves relative to the cable-folding member between a pinching position for pinching a portion having a crease of the flat cable folded along the direction-defining section and a releasing position for releasing the portion having the crease. The cable-pinching member includes a pinching section for causing plastic deformation in the crease.

Also, according to this aspect, since the crease of the flat cable folded by the cable-folding member is plastically deformed by the pinching member, it is possible to precisely and easily fold the flat cable.

In still another aspect of the present invention, the present invention is directed to a cable-folding member for folding a flat cable at a given folding angle, including a mounting table for supporting a flat cable; a direction-defining section provided on the mounting table for defining a direction of folding a flat cable to be processed; a positioning section for positioning the flat cable on the mounting table to define a folding angle of the flat cable in association with the direction-defining section; and pressing means provided on the mounting table for pressing a portion having a crease of the flat cable folded along the direction-defining section between the pressing means and the mounting table. The pressing means can move relative to the mounting table between a pressing position where the pressing means presses the portion having the crease of the flat cable to cause plastic deformation in the crease and a detachable position where the pressing means releases the flat cable to set the flat cable on the positioning section detachably.

According to this aspect, since the positioning section and direction-defining section are provided on the mounting table, the flat cable is folded on the mounting table. The portion having the crease of the flat cable is pressed between the mounting table and the pressing means. Accordingly, it is possible to easily fold the flat cable at the direction defined by the direction-defining section upon the folding process.

In view of the above problems, an object of the present invention is to provide an apparatus and a method for folding a flat cable that can enhance accuracies in dimension and working in a successively folding work and carry out the successively folding work efficiently.

In order to solve the above problems, the present invention is directed to an apparatus for successively folding a flat cable wherein a strip-like flat cable is folded at at least two adjacent positions to position the flat cable in a predetermined wiring pattern. The apparatus includes a mounting table for supporting the flat cable; a first direction-defining section provided on the mounting table for defining a direction of folding a flat cable to be processed at a first working position; a positioning section for positioning the flat cable on the mounting table to define a folding angle of the flat cable at the first working position in association with the first direction-defining section; a pressing and securing section provided on the mounting table for pressing a folded portion of the flat cable folded along the first direction-defining section between the pressing and securing section and the mounting table and for securing the folded portion to the mounting table; a second direction-defining section provided on the mounting table for defining a direction of folding a flat cable to be processed at a second working position; and a pressing section provided on the mounting table for pressing a folded portion of the flat cable folded along the second direction-defining section between the pressing section and the mounting table. The pressing and securing section and the pressing section are able to move relative to the mounting table between a pressing position where the sections press the folded portions of the flat cable at the first and second working positions to cause plastic deformation in the folded portions and a releasing position where the sections move away from the flat cable to release the flat cable to be set on the mounting table detachably.

According to the present invention, the flat cable, which is positioned on the base by the positioning block, is folded by the first direction-defining surface with the folding angle being defined. The pressing and securing unit causes plastic deformation in the folded portion. Thus, it is possible to enhance accuracies in dimension and working at the first working position of the flat cable.

The pressed flat cable is secured to the base by the pressing and securing unit. The secured flat cable is folded by the second direction-defining surface with the folding angle of the flat cable being defined. The folded portion is subject to plastic deformation by the pressing plate. Consequently, it is possible to enhance accuracies in dimension and operation at the second working position of the flat cable.

Further, since the flat cable, which is pressed at the first working position, is secured to the base by the pressing and securing unit, the operator easily folds the flat cable at the second working position.

Accordingly, the successive folding apparatus for a flat cable according to the present invention can enhance accuracies in dimension and working and efficiently carry out the successive folding operation of the flat cable.

In another aspect of the present invention, a production drawing board includes a successive folding apparatus for a flat cable. The production drawing board includes a drawing board body on which an arrangement path for a flat cable to be worked is set beforehand to arrange the flat cable. One or more successive folding apparatuses for the flat cable are fixed at positions corresponding to folding positions of the flat cable defined on the arrangement path on the drawing board.

According to this aspect, the successive folding apparatuses for the flat cable are disposed at the positions corresponding to the folding positions of the flat cable on the arrangement path of the flat cable. Accordingly, it is possible to more efficiently carry out the successive folding operation for the flat cable, since it is possible to continuously carry out a connecting work for a connector and an attaching work for external parts as well as the successive folding operation for the flat cable.

In another aspect of the present invention, a successive folding method for a flat cable wherein a strip-like flat cable is folded at two adjacent positions to work the flat cable in a predetermined wiring pattern, includes the steps of: positioning a flat cable to be worked by a positioning section and disposing the flat cable on a mounting table for disposing the flat cable; folding the flat cable along a first direction-defining section, pressing a folded portion of the flat cable disposed on the mounting table by a pressing and securing section, and securing the folded portion to the mounting table; and folding the flat cable secured to the mounting table along a second direction-defining section, and pressing a folded portion of the flat cable by a pressing section.

According to this method, the flat cable is disposed on the mounting table with the flat cable being positioned in the disposing step, the flat cable is folded along the first direction-defining section in the pressing and securing step, pressing the folded portion, and securing the folded portion to the mounting table. Accordingly, it is possible to enhance accuracies in dimension and working at the first working position of the flat cable.

Then, in the pressing step, the flat cable secured to the mounting table is folded along the second direction-defining section and the folded portion is pressed. Accordingly, it is possible to enhance accuracies in dimension and operation at the second working position of the flat cable.

Therefore, the method for folding the flat cable in accordance with the present invention can enhance accuracies in dimensions and operation and carry out the successive folding work efficiently.

In view of the above problems, an object of the present invention is to provide a cable-holding assembly and a method for successively folding a flat cable by using the cable-holding assembly that can hold and fold the flat cable on a predetermined arrangement path on a drawing board stably and can hold the flat cable detachably in the case of folding the flat cable at successively folding positions without breaking the flat cable.

A cable-holding assembly for folding a flat cable at a given folding angle in accordance with the present invention includes a mounting table for supporting a flat cable; a direction-defining section provided on the mounting table for defining a direction of folding a flat cable to be worked; a positioning section for positioning the flat cable on the mounting table to define a folding angle of the flat cable in association with the direction-defining section; and a pressing device provided on the mounting table for pressing a portion of the flat cable having a crease folded along the direction-defining section between the pressing device and the mounting table. The pressing device can move relative to the mounting table between a pressing position where the pressing device presses the portion of the flat cable having the crease to cause plastic deformation in the crease and a detachable position where the pressing device releases the flat cable to detachably set the flat cable on the positioning section.

According to the present invention, the folding apparatus is provided at the position corresponding to the folding position on the arrangement path of the flat cable. The flat cable is provided on the cable-holding assembly with one side of the flat cable coming into contact with the mounting table and is held on the mounting table by setting the holding piece at the holding position. Under this condition, since the flat cable is restrained from moving by the mounting table, the restraining section, and the holding piece, the flat cable is held on the arrangement path stably without coming out of the slot. The flat cable is folded along the direction-defining section, so that the flat cable is folded in the predetermined direction.

Thus, the crease is formed at the folding position in the folded flat cable and is held in the cable-holding assembly. The holding position is released by displacing the holding piece of the cable-holding assembly in the detachable position. An operator can easily remove the flat cable from the other side of the flat cable.

Even if the cable-holding assemblies are provided at the positions corresponding to the successive folding positions on the arrangement path, the folded flat cable can be easily removed from the assemblies toward the other side of the flat cable. Consequently, as described above, it is possible to remove the flat cable from the cable-holding assembly without breaking the flat cable by turning the folded portion of the flat cable.

Accordingly, the cable-holding assembly according to the present invention can hold and fold the flat cable on the predetermined arrangement path stably and can insert and remove the flat cable into and from the cable-holding assembly without breaking the flat cable after successively folding the flat cable in the case of disposing the flat cable at the successively folding positions.

In another aspect of the present invention, the cable-holding assembly further comprises a device for pressing a folded portion of the flat cable folded along the direction-defining section. The pressing device can move relative to the mounting table between a pressing position where the folded portion of the flat cable is pressed between the pressing device and the mounting table to cause plastic deformation in the folded portion and a spaced position where the pressing device is spaced away from the folded portion to set the flat cable detachably on the mounting table.

According to this aspect, it is possible to easily cause plastic deformation in the folded portion of the flat cable that is folded along the direction-defining section, since the cable-holding assembly is provided with the pressing device. Also, it is possible to easily remove the flat cable from the cable-holding assembly without breaking the flat cable by displacing the pressing device in the spaced position.

In still another aspect of the present invention, a method for successively folding a flat cable wherein a strip-like flat cable to be worked is held along an arrangement path and is folded on at least two adjacent predetermined positions, includes the steps of inserting the flat cable laterally into a slot provided at a position corresponding to a first folding position of the flat cable so that the flat cable is restrained from moving to a first folding direction; forming a first crease in the flat cable by folding the flat cable along a direction-defining section provided on the slot; pressing the first crease to cause plastic deformation; disposing the flat cable on a mounting table that is provided on a cable-holding assembly disposed at a position corresponding to a second folding position of the flat cable on the arrangement path and supports a flat cable to be worked so that the mounting table comes into contact with one side of the flat cable on which the first pressing step is completed and for restraining the flat cable from moving to a second folding direction; covering the other side of the flat cable on the mounting table by a holding piece provided on the mounting table and for restraining the flat cable from moving in a direction opposite from the second folding direction; forming a second crease in the flat cable by folding the flat cable along a direction-defining section provided on the restraining section; pressing the second crease to cause plastic deformation; and releasing the flat cable from the holding piece.

According to this method, the flat cable to be worked is held in the slot in the slot-inserting step, the flat cable is folded along the first direction-defining section in the first folding step to form the crease, and the crease is pressed in the first pressing step to cause plastic deformation in the crease. After finishing the first pressing step, the flat cable is disposed on the mounting table of the cable-holding assembly in the disposing step so that the flat cable comes into contact with the mounting table at the one side of the flat cable and the flat cable is restrained from moving to the second folding direction by the restraining section. In the holding step, the other side of the flat cable is covered by the holding piece, and the flat cable is restrained from moving in the direction opposite from the second folding direction. In the second folding step, the flat cable is folded along the direction-defining section to form the crease. The formed crease is subject to plastic deformation in the second pressing step.

In the respective steps, the flat cable is subject to plastic deformation at the respective folding positions. The flat cable can be removed from the cable-holding assembly by releasing the other side of the flat cable by the holding piece in the releasing step. Consequently, it is possible to remove the flat cable from the slot.

The slot is used at the first holding position of the flat cable. Since at least two folding positions are close, it is possible to hold the flat cable stably along the arrangement path, even if the cable-holding assembly of the present invention is disposed at one folding position. Accordingly, it is possible to hold the flat cable more stably, if the cable-holding assemblies of the present invention are disposed on at least two folding positions.

Accordingly, the method for successively folding the flat cable in accordance with the present invention can stably hold the flat cable on the predetermined arrangement path on the drawing board and insert and remove the flat cable into and from the cable-holding assembly without breaking the flat cable after folding it.

For convenience of explanation, the words "first" and "second" are expressed to distinguish the "close" and "successive" positions at "at least two positions" from each other. These words do not mean an order of operation. The words "at least two positions" mean two or more positions. For example, if there are successive folding plural positions, the "slots" and "cable-holding assemblies" are disposed alternately. Even if at least a "slot" is disposed at a folding position, it is possible to obtain the same effect as described above.

An aspect of the present invention includes an apparatus for folding a flat cable having a connector on an end thereof to arrange the flat cable in a pattern, the apparatus comprising a drawing board for arranging a flat cable thereon, an arrangement path of the flat cable being defined on the drawing board; a connector holder provided on the drawing board that detachably holds the connector attached to the flat cable at a connector holding position defined on the arrangement path; and a plurality of cable folding members provided on the drawing board at folding positions of the flat cable defined on the arrangement path, each the cable folding member including a positioning element for positioning the flat cable on the arrangement path and a direction defining portion for defining a folding angle of the flat cable in association with the positioning element. In a further aspect of the present invention, the direction defining portion is formed on an outer wall of the positioning element, and the direction defining portion includes a guide surface that extends in a direction intersecting a longitudinal direction of the flat cable defined by the positioning element at the folding angle and guides an edge of the folded portion of the flat cable. Further, the apparatus may include a cable pinching member that pinches a portion of the flat cable having a crease folded by the cable folding member to cause plastic deformation of the flat cable in the crease.

A further aspect of the present invention includes a method of folding a flat cable by using an apparatus for folding a flat cable having a connector on an end thereof to arrange the flat cable in a pattern, the apparatus including a drawing board for arranging a flat cable thereon, an arrangement path of the flat cable being defined on the drawing board, a connector holder provided on the drawing board that detachably holds the connector attached to the flat cable at a connector holding position defined on the arrangement path, and a plurality of cable folding members provided on the drawing board at folding positions of the flat cable defined on the arrangement path, each cable folding member including a positioning element for positioning the flat cable on the arrangement path and a direction defining portion for defining a folding angle of the flat cable in association with the positioning element, the method including detachably locking a connector attached to a flat cable to the drawing board by the connector holder; and positioning the flat cable on the arrangement path so that the connector is positioned on an upstream side of the connector holder along the arrangement path and folding the flat cable at folding angles defined by the cable folding members while the cable folding members successively and detachably hold the flat cable on upstream sides thereof along the arrangement path. Further, the method may include pinching a portion of the flat cable having a crease folded by the cable folding member to cause plastic deformation of the flat cable in the crease.

In a further aspect of the present invention a cable folding member for folding a flat cable at a given folding angle includes a direction defining portion that defines a folding direction of a flat cable; and a positioning element that positions the flat cable so that the positioning element defines a folding angle of the flat cable in association with the direction defining portion. Further, the cable folding member may further include a cable receiving section extending from the positioning element and having a groove therein for making a crease in the flat cable along a line on which the flat cable is folded.

A further aspect of the invention includes a cable pinching member for use together with a cable folding member having a direction defining portion for defining a folding direction of a flat cable and a positioning element for positioning the flat cable to define a folding angle of the flat cable in association with the direction defining portion, wherein the cable pinching member is configured to move relative to the cable folding member between a pinching position for pinching a portion of the flat cable having a crease along the direction defining portion and a releasing position for releasing the portion having the crease; and the cable pinching member includes a pinching section for causing plastic deformation in the crease.

A cable folding member for folding a flat cable at a given folding angle may include a mounting table for supporting a flat cable; a direction defining portion provided on the mounting table for defining a direction of folding a flat cable; a positioning element for positioning the flat cable on the mounting table to define a folding angle of the flat cable in association with the direction defining portion; and a pressing device provided on the mounting table that presses a portion of the flat cable having a crease folded along the direction defining portion between the pressing device and the mounting table; the pressing device being moveable relative to the mounting table between a pressing position where the pressing device presses the portion of the flat cable having a crease to cause plastic deformation in the crease and a releasing position where the pressing device releases the flat cable.

A further aspect of the present invention includes an apparatus for successively folding a flat cable wherein a flat cable is folded at a plurality of adjacent positions to arrange the flat cable in a predetermined wiring pattern, the apparatus including a mounting table for supporting the flat cable; a first direction defining portion provided on the mounting table for defining a direction of folding a flat cable arranged at a first folding position; a positioning element for positioning the flat cable on the mounting table to define a folding angle of the flat cable at the first folding position in association with the first direction defining portion; a pressing and securing unit provided on the mounting table for pressing a folded portion of the flat cable folded along the first direction defining portion between the pressing and securing unit and the mounting table and for securing the folded portion to the mounting table; a second direction defining portion provided on the mounting table for defining a direction of folding a flat cable arranged at a second folding position; and a pressing unit provided on the mounting table for pressing a folded portion of the flat cable folded along the second direction defining section between the pressing unit and the mounting table; the pressing and securing unit and the pressing unit being individually moveable relative to the mounting table between a pressing position in which each the pressing and securing unit and the pressing unit press the folded portions of the flat cable at the first and second folding positions, respectively, to cause plastic deformation in the folded portions, and a releasing position where each the pressing and securing unit and the pressing unit are spaced away from the flat cable to release the flat cable. Further, the invention may including in combination, a successive folding apparatus for a flat cable and a drawing board, wherein the drawing board includes a drawing board body having an arrangement path for the flat cable defined thereon, and wherein one or more successive folding apparatuses for a flat cable are fixed at positions corresponding to folding positions of the flat cable defined on the arrangement path on the drawing board.

A further aspect of the present invention provides a method for successively folding a flat cable wherein a flat cable is folded at a plurality of adjacent positions to arrange the flat cable in a predetermined wiring pattern including positioning a flat cable at a positioning section and disposing the flat cable on a mounting table; folding the flat cable along a first direction defining portion, pressing the folded portion of the flat cable disposed on the mounting table with a pressing and securing unit, and securing the folded portion of the flat cable to the mounting table; and folding the flat cable secured to the mounting table along a second direction defining portion, and pressing the second folded portion of the flat cable with a pressing unit. The present invention may provide a cable holding assembly unit for successively folding a flat cable at a plurality of positions to arrange the flat cable in a predetermined wiring pattern including a folding apparatus provided at a first folding position for folding the flat cable, the folding apparatus including a cable holding base that receives a flat cable; a first direction defining portion provided on the cable holding base that defines a direction of folding a flat cable arranged at the first folding position; a first positioning element that positions the flat cable on the cable holding base and defines a first folding angle of the flat cable at the first folding position in association with the first direction defining portion; and a first pressing and securing unit provided on the cable holding base that presses the folded portion of the flat cable folded along the first direction defining portion between the first pressing and securing unit and the cable holding base and secures the folded portion of the flat cable to the cable holding base; and a cable holding assembly provided at a second folding position for folding the flat cable, the cable holding assembly including a mounting table that receives the flat cable; a second direction defining portion provided on the mounting table that defines a direction of folding a flat cable arranged at the second folding position; a second positioning element that positions the flat cable on the mounting table and defines a second folding angle of the flat cable at the second folding position in association with the second direction defining portion; and a second pressing and securing unit provided on the mounting table that presses the folded portion of the flat cable folded along the second direction defining portion between the second pressing and securing unit and the mounting table and secures the folded portion of the flat cable to the mounting table. Further the cable holding assembly may further include a restraining block provided on the mounting table, wherein the second direction defining portion provided on the mounting table comprises a surface of the restraining block; and a holding member provided on the mounting table; wherein the restraining block in association with the holding member restrains movement along the mounting table of a flat cable received from the folding apparatus. The holding member may include a plate provided on the mounting table; and a cut-off portion provided on a bottom surface of the plate; wherein the cut-off portion, an upper surface of the mounting plate, and a side surface of the restraining block define a containing section that accommodates the flat cable therein and restrains movement of the flat cable; a bolt extending from the mounting table; and a slot provided in the plate that receives the bolt therein, so that the plate is slidable along the mounting table toward and away from the restraining block; wherein the holding member is moveable between a holding position in which the holding member is positioned adjacent the restraining block covers a flat cable positioned adjacent the restraining block and a retracted position in which the holding member is retracted from the restraining block and the flat cable is uncovered by the holding member. The cable holding assembly unit may further include a switch mounted on the cable holding base of the folding apparatus provided at the first folding position, the switch being positioned on the cable holding base such that when the first pressing and securing unit provided on the cable holding base presses the folded portion of the flat cable folded along the first direction defining portion between the first pressing and securing unit and the cable holding base, the switch generates an electrical signal indicating that the folded portion of the flat cable has been pressed.

A further aspect of the present invention provides a method of successively folding a flat cable held along an arrangement path and folded at a plurality of adjacent positions, the method including inserting the flat cable into a cable folding apparatus provided at a first folding position of the flat cable on the arrangement path so that the flat cable is restrained from moving in a first folding direction; forming a first crease in the flat cable by folding the flat cable along a direction defining portion provided in the cable folding apparatus; pressing the first crease to cause plastic deformation of the flat cable; disposing the flat cable on a mounting table provided in a cable holding assembly at a second folding position of the flat cable on the arrangement path, the mounting table supporting the flat cable so that the mounting table contacts a side of the flat cable, and restraining the flat cable from moving in a second folding direction; holding the flat cable with a holding member provided on the mounting table and restraining the flat cable from moving in a direction opposite from the second folding direction; forming a second crease in the flat cable by folding the flat cable along a direction defining portion provided in the cable holding assembly; pressing the second crease to cause plastic deformation of the flat cable; and releasing the flat cable from the holding member. The method of inserting the flat cable into the cable folding apparatus further may include inserting the flat cable laterally into a slot provided at a first folding position of the flat cable so that the flat cable is restrained from moving in the first folding direction. The method may further include moving the holding member over the flat cable and covering the flat cable with the holding member provided on the mounting table and restraining the flat cable from moving in a direction opposite from the second folding direction.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which:

FIG. 9 is a perspective view of a cable-folding member and a cable-pinching member according to a third embodiment of the present invention, illustrating folding a flat cable;

FIG. 10 is a perspective view of the cable-pinching member shown in FIG. 9, illustrating a rear side of the member;

DETAILED DESCRIPTION OF THE INVENTION

Figure 1:
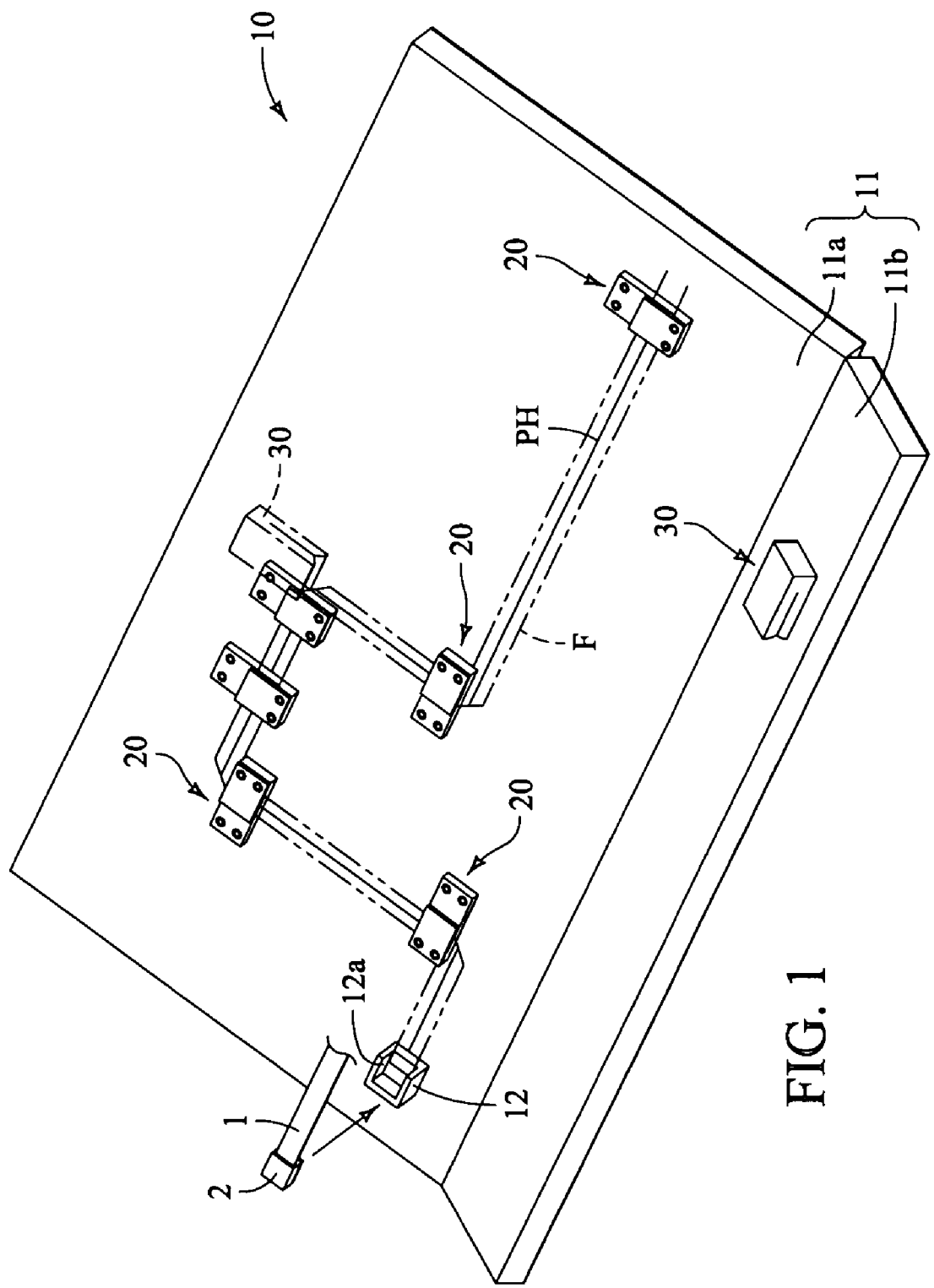
FIG. 1 is a schematic perspective view of an apparatus for folding a flat cable according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Referring now to the drawings, preferred embodiments of the present invention will be described below.

FIG. 1 is a schematic perspective view of an apparatus for folding a flat cable in accordance with a first embodiment of the present invention.

Referring to FIG. 1, a flat cable F to be processed in the illustrated embodiment is well known and includes an electric conductive wire, an insulation resin sheath, and a connector 2 attached to a distal end thereof An apparatus 10 for folding the flat cable F includes a drawing board 11. In the illustrated embodiment, the drawing board 11 includes an arrangement section 11a for arranging the flat cable F thereon and a supporting section 11b for supporting working tools. The arrangement section 11a is a slanted or inclined work table that an operator can face by looking downwardly. The flat cable F is provided on the arrangement section 11a. The supporting section 11b may be constructed of any suitable material such as, for example, a wood board, and is connected to a lower end of the arrangement section 11a so that the section 11b can support, for example, a cable-pinching member 30.

A connector holder 12 and a plurality of cable-folding members 20 are provided along the arrangement path PH for the flat cable F on the arrangement section 11a of the drawing board 11. In the illustrated embodiment, a solid line for indicating the arrangement path PH is described on the arrangement section 11a.

The connector holder 12 is configured in a box shape and may be constructed of any suitable material such as, for example, a resin material. The connector holder 12 is provided with a recessed portion 12a for receiving the connector 2. The recessed portion 12a is open at the top of the connector holder 12 and is downstream of the beginning of the arrangement path PH. An operator can place the flat cable F on the arrangement path PH by moving the connector 2 up and down from and into the recessed portion 12a of the connector holder 12.

The cable-folding members 20 have the same configuration and may be assembled from separate parts. Alternatively, the cable folding members 20 may be formed unitarily and in one piece. Further, the cable folding members 20 may be constructed from any suitable material such as for example, resin material. The cable-folding members 20 are disposed in folding positions for the flat cable F on the arrangement path PH and secured to the arrangement section 11a of the drawing board 11 in accordance with directions of the upstream and downstream sides on the arrangement path PH.

Figure 2:
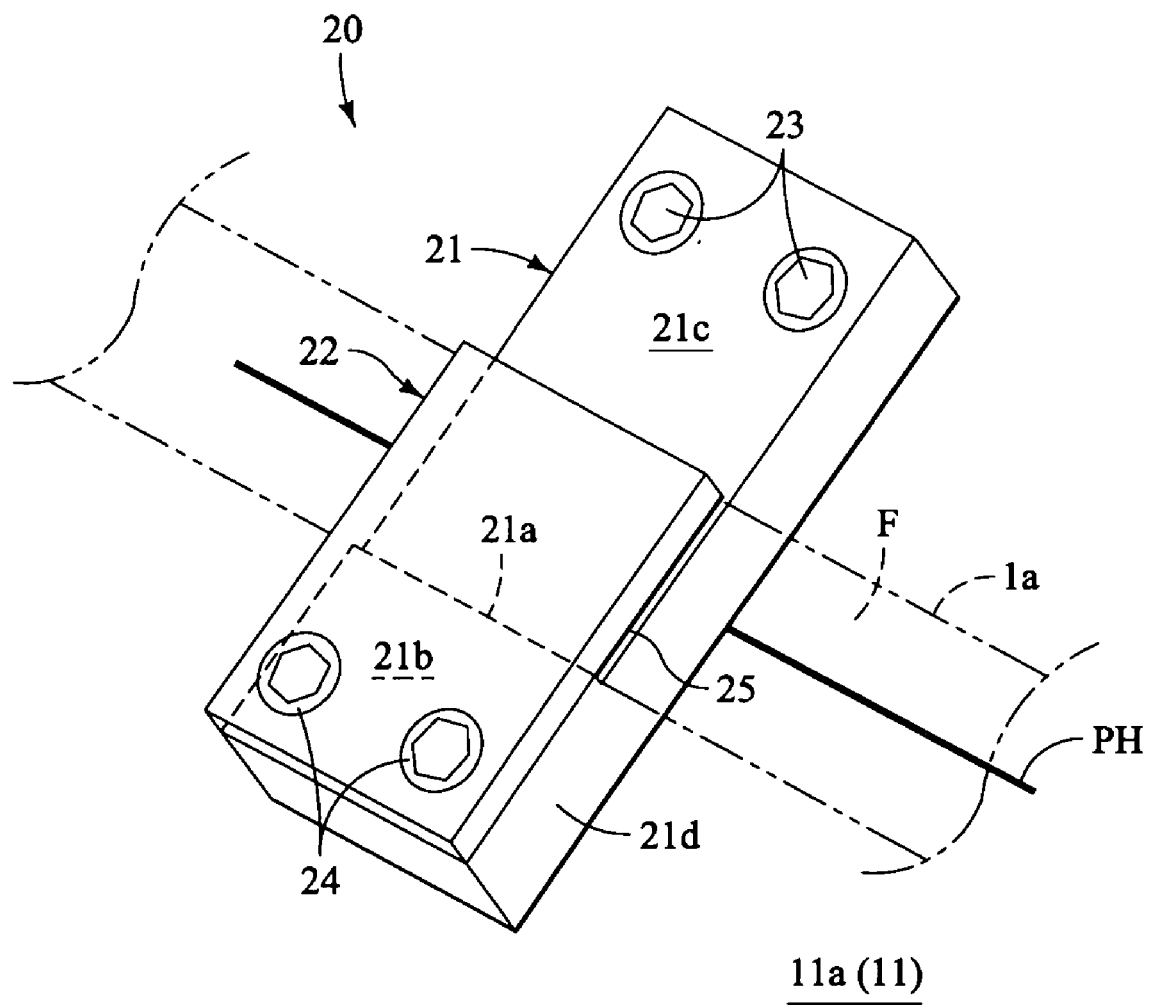
FIG. 2 is a perspective view of a cable-folding member according to the embodiment of FIG. 1.
Figure 3A:
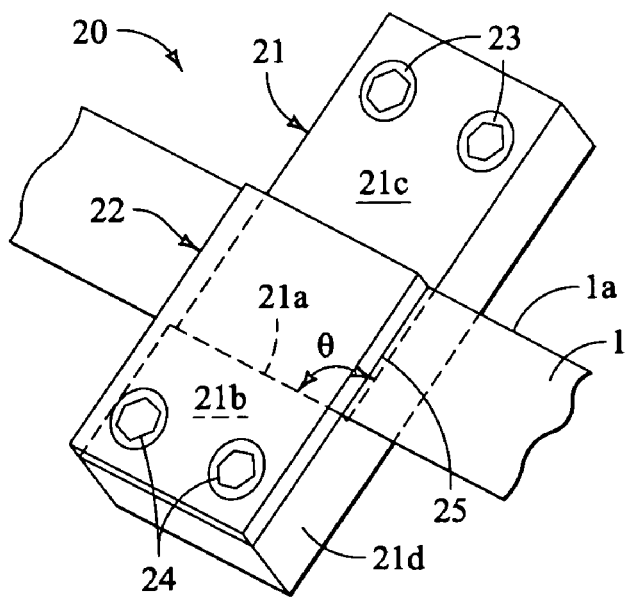
FIGS. 3A and 3B are perspective views of a cable-folding member according to the embodiment of FIG. 1, illustrating a process for folding a flat cable.
Figure 3B:
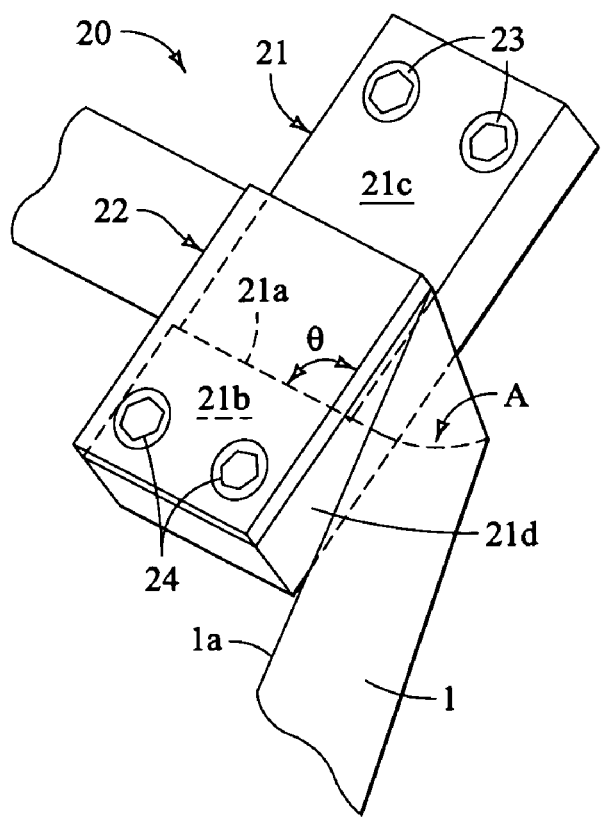

FIG. 2 is a perspective view of the cable-folding member 20 in the first embodiment shown in FIG. 1. FIGS. 3(A) and 3(B) are perspective views of the cable-folding members 20, illustrating a process of folding the flat cable F.

Referring to FIGS. 2, 3A, and 3B, the cable-folding member 20 includes a rectangular solid block body 21 and a plate 22 to be secured to the upper surface of the block body 21. In the illustrated embodiment, the block body 21 and the plate 22 serve as a positioning element for disposing the flat cable F on the arrangement path PH.

The block body 21 may be formed of any suitable material and in the present embodiment is a molded resin material and is fixed on the arrangement section 11a of the drawing board 11 by means of a pair of screws 23. The block body 21 is provided on the upper portion with a horizontal upper step surface 21b and a horizontal lower step surface 21c that define a vertical surface 21a having a height sufficient to pinch the flat cable F. The vertical surface 21c serves to guide an edge 1a of the flat cable F. The horizontal lower step surface 21c serves to receive the rear side of the flat cable F. This can accurately arrange the flat cable F along the arrangement path PH on the arrangement section 11a of the drawing board 11 as shown in FIG. 3A.

The plate 22 is secured to the horizontal upper step surface 21b of the block body 21 by a pair of screws 24 so that a part of the plate 22 extends in parallel with the horizontal lower step surface 21c of the block body 21 to an intermediate part of the surface 21c. The cable-folding member 20 can dispose the flat cable F on the arrangement path PH with the flat cable F being pinched in a slot 25 defined between the plate 22 and the horizontal lower step surface 21c of the block body 21. The plate 22 made be formed of any suitable material and in the present embodiment, the plate 22 is made of a transparent acrylic plate so that the position of the flat cable F inserted between the plate 22 and the horizontal lower step surface 21c of the block body 21 may be viewed. Since the plate 22 terminates on the intermediate part of the horizontal lower step surface 21c of the block body 21, the exposed portion of the surface 21c serves as a guide surface for guiding the flat cable F into the slot 25.

Further, the block body 21 has an outer sidewall 21d that is perpendicular to the vertical surface 21a in the illustrated embodiment. The outer sidewall 21*d* serves as a guide surface or a direction-defining portion that defines a folding direction of the flat cable F positioned by the block body 21.

Figure 4:
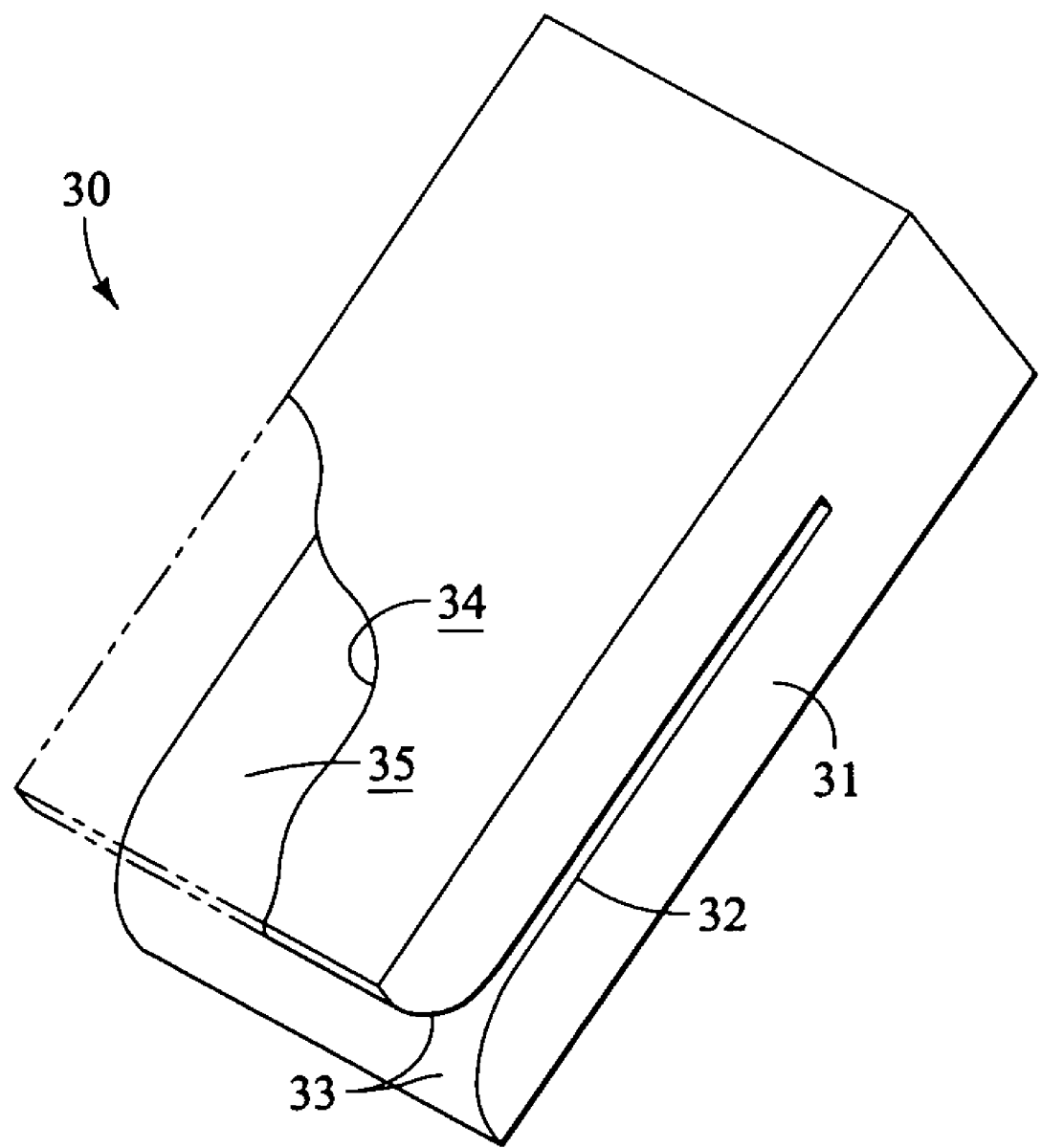
FIG. 4 is a perspective view of a cable-pinching member according to the embodiment of FIG. 1.
Figure 5A:
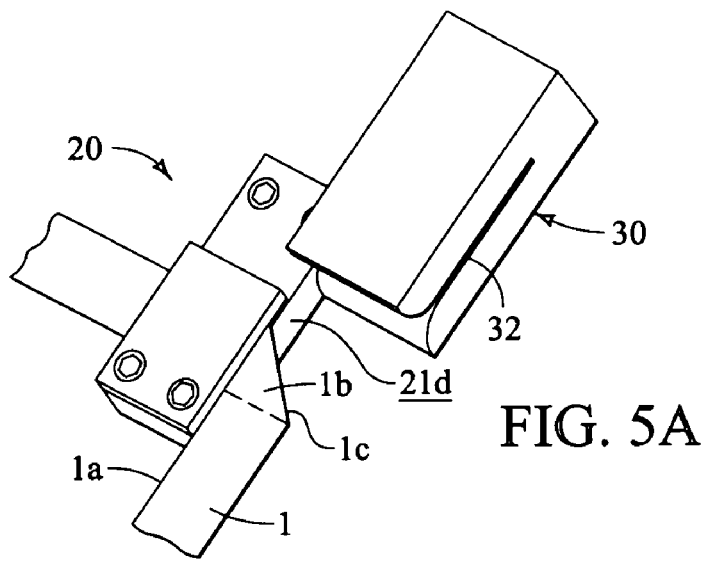
FIGS. 5A, 5B, and 5C are perspective views of a cable-pinching member according to the embodiment of FIG. 1.
Figure 5B:
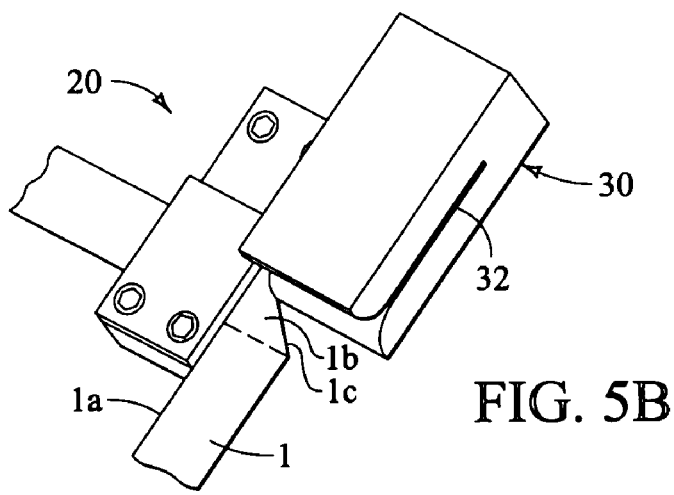
Figure 5C:
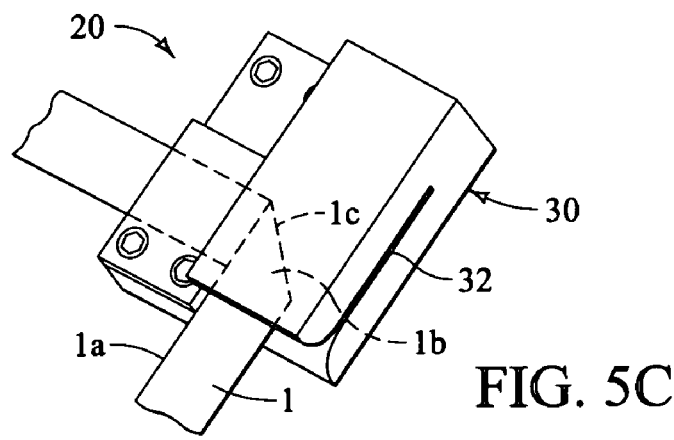

FIG. 4 is a perspective view of a cable-pinching member 30 that may be used in the first embodiment shown in FIG. 1. FIGS. 5A to 5C are perspective views of the pinching member 30, illustrating a process of pinching the flat cable F by the member 30.

Referring to FIGS. 4, 5A, and 5B, the cable-folding member 20 folds the flat cable F at the given angle and position, and the cable-pinching member 30 causes plastic deformation in a crease 1*c* formed by the folding member 20. The pinching member 30 in the first embodiment is configured as a rectangular block body 31 having a slot 32. The block body 31 may be formed of any suitable material such as, for example, a solid resin. The slot 32 is provided on an inlet portion with curved portions 33 and on an inner portion with pinching surfaces 34 and 35 that pinch a portion 1*b* having the crease 1*c* of the flat cable F.

Next, by referring to FIGS. 1 to 5, an operation of the first embodiment will be described below.

In FIG. 1, the flat cable F having the connector 2 at the distal end thereof is fed on the drawing board 11 and the connector 2 is fitted in the connector holder 12. The connector holder 12 detachably locks the connector 2 attached to the flat cable F on the drawing board 11 and the other end of the flat cable F is positioned on a terminal end of the arrangement path PH.

The connector holder 12 is disposed on an upstream end of the arrangement path PH and the flat cable F is disposed from the upstream side to the downstream side on the arrangement path PH. At this time, the flat cable F is inserted into the slots 25 in the cable-folding members 20 on the arrangement path PH from the upstream side to the downstream side, as shown in FIG. 3A, and then the flat cable F is positioned on the arrangement path PH. This positioning operation enables the flat cable F to be positioned with respect to the outer sidewall 21*d* that serves as the direction-defining portion. Since the connector holder 12 locks the connector 2 attached to the flat cable F on the drawing board 11, the connector holder 12 defines a first folding position of a first cable-folding member 20 in the folding apparatus 10. With respect to the other cable-folding members 20 following the first cable-folding member 20, the respective upstream cable-folding members 20 define the respective folding positions of the respective downstream cable-folding members 20.

As shown in FIG. 3B, the flat cable F at the downstream side is folded in a direction shown by an arrow A and an edge 1*a* of the folded portion is disposed along the outer sidewall 21*d*, thereby folding the flat cable F. Consequently, the flat cable F can be folded precisely at a given folding angle θ (90 degrees in the illustrated embodiment) by the block body 21 and outer sidewall 21*d*.

Figure 6A:
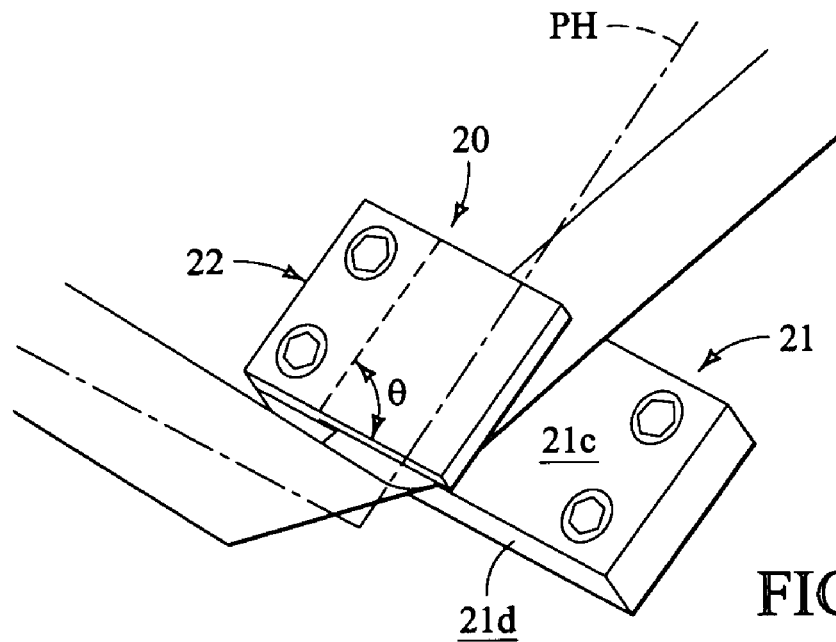
FIGS. 6A and 6B are perspective views of a cable folding member according to the embodiment of FIG. 1, illustrating a process for folding a flat cable.
Figure 6B:
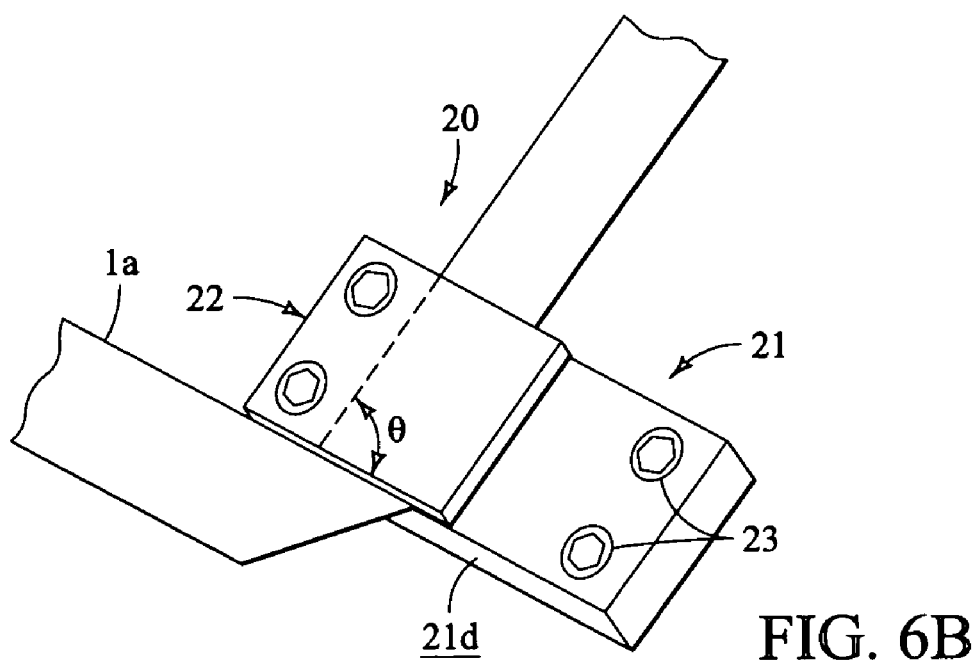

The invention is not limited to the downstream cable-folding member 20 folding the flat cable F, as shown in FIGS. 3A and 3B. Additionally, the upstream cable-folding member 20 may fold the flat cable F. The most upstream cable-folding member 20 following the connector holder 12 folds the flat cable F extending from the connector holder 12 at the angle of 90 degrees in the first embodiment shown in FIG. 1. However, for example, as shown in FIGS. 6A and 6B, after the flat cable F is initially folded at an upstream side from the cable-folding member 20, the flat cable F may be inserted into the slot 25 of the cable-folding member 20 to define a folding angle θ from the upstream side to the downstream side between the outer sidewall 21*d* and the vertical surface 21*a* defining the slot 25.

When the folding process is finished successively from the upstream side to the downstream side on the arrangement path PH, the flat cable F is accurately disposed at the given folding positions and angles from the upstream side to the downstream side on the arrangement path PH.

Next, as shown in FIGS. 5A to 5C, a folded portion 1*b* of the flat cable F having the crease 1*c* is pressed by a pinching process. Although it is preferable that the pinching process is carried out after every folding process, the pinching process may be carried out successively from the upstream side to the downstream side after all of the folding processes are finished.

In the pinching process, as shown in FIG. 5A, the cable-pinching member 30 brings its outer sidewall into contact with the outer sidewall 21*d* of the block body 21 of the cable-folding member 20 so that the slot 32 of the cable-pinching member 30 faces toward the folded portion 1*b* having the crease 1*c* of the flat cable 20. As shown in FIG. 5B, the cable-pinching member 30 continues to slide on the cable-folding member 20. As shown in FIG. 5C, the folded portion 1*b* of the flat cable F having the crease 1*c* enters the slot 32 in the cable-pinching member 30. Consequently, the pinching surfaces 34 and 35 (see FIG. 4) of the block body 31, which defines the slot 32, presses the folded portion 1*b* having the crease 1*c* to cause plastic deformation in the crease 1*c*.

According to the first embodiment, it is possible to define the folding position of the flat cable F from an end having the connector 2 by mounting the connector 2 on the connector holder 12. Then, the flat cable F is disposed on the cable-folding members 20 one after another from the connector holder 12 on the arrangement path PH. While the block body 21 of the cable-folding member 20 defines the folding position of the flat cable F, the outer sidewall 21*d* defines the given folding angle θ when the flat cable F is folded in the direction defined by the outer sidewall 21*d*. Thus, it is possible according to the first embodiment to carry out the folding process while defining the precise folding positions and angles whether the flat cable has a marking or not. Accordingly, the first embodiment has an advantage of eliminating a marking process.

In the case of using the cable-folding member 20 in the first embodiment, since the folding angle of the flat cable F can be defined by disposing the edge 1*a* of the folded portion of the flat cable F along the outer sidewall 21*d*, it is possible to fold the flat cable F without interposing any foreign substances into the folded portion. Consequently, a dimension of the folded flat cable F becomes more accurate.

Next, second and third embodiments of the present invention will be described below by referring to FIGS. 7 to 12. In order to avoid redundancy, the same reference signs in FIGS. 7 to 12 indicate the same elements as those in the first embodiment shown in FIGS. 1 to 6.

Figure 7:
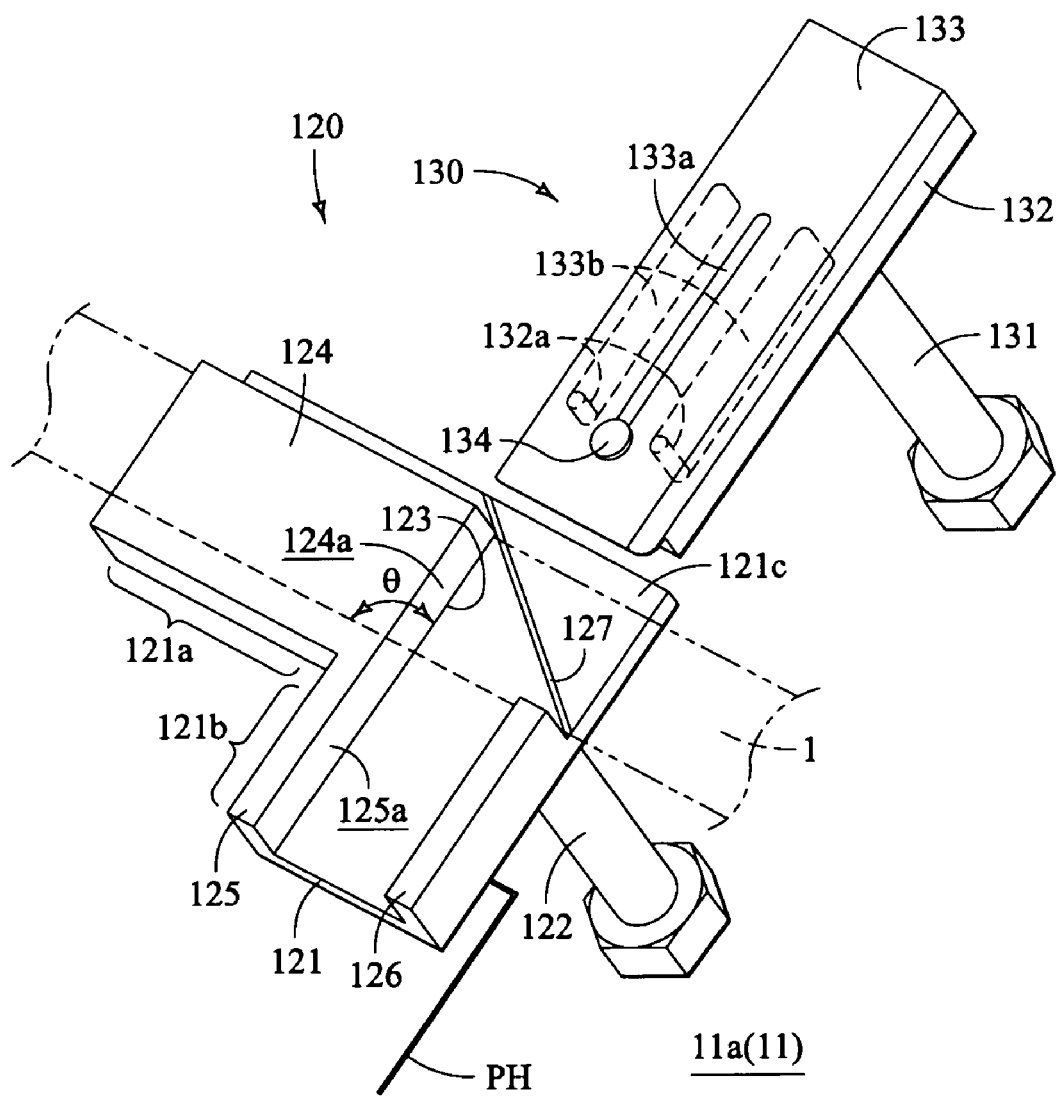
FIG. 7 is a schematic perspective view of a cable-folding member and a cable-pinching member according to a second embodiment of the present invention.
Figure 8A:
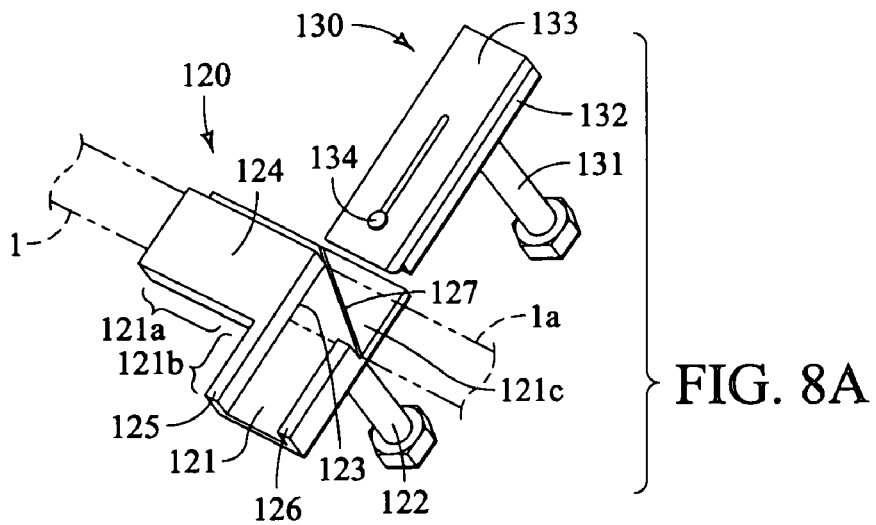
FIGS. 8A, 8B, and 8C are perspective views of a cable folding member according to the embodiment of FIG. 7, illustrating a process for folding a flat.
Figure 8B:
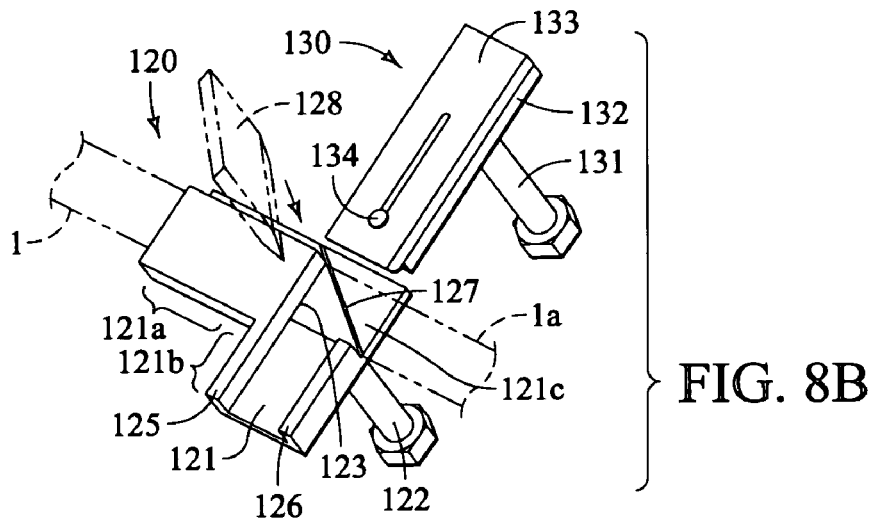
Figure 8C:
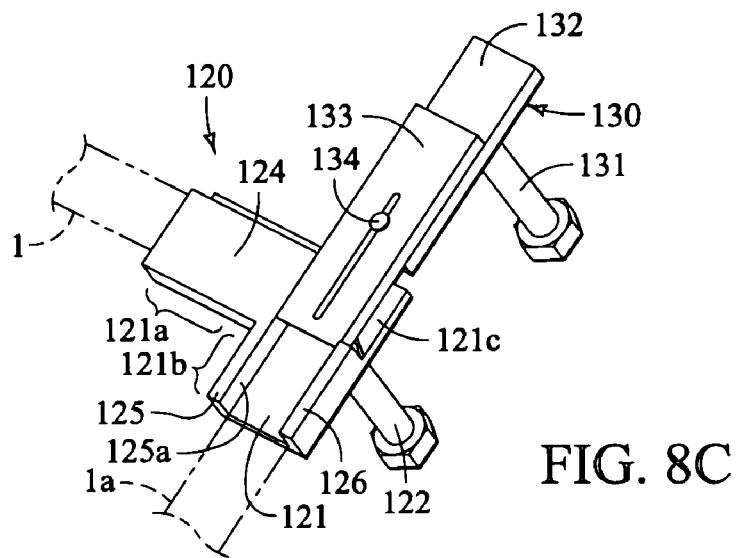

FIG. 7 is a perspective view of a cable-folding member 120 and a cable-pinching member 130 according to a second embodiment. FIGS. 8A to 8C are perspective views of the second embodiment, illustrating a folding process of a flat cable in the second embodiment shown in FIG. 7.

By referring to FIGS. 7, 8A, 8B, and 8C, the cable-folding member 120 includes a base block 121. The base block 121 is substantially L-shaped and may be formed of any suitable material such as, for example, a molded resin material. The base block 121 is secured to the drawing board 11 by a supporting pole 122 standing on the drawing board 11.

A first wing 121a of the base block 121 extending on the upstream side of the arrangement path PH serves as a positioning portion for disposing the flat cable F on the arrangement path PH in the illustrated second embodiment. The base block 121 includes a plate 124 having a slot 123 that extends perpendicular to second wing 121b. When the flat cable F enters the slot 123, the flat cable F can be positioned on the upstream side of the arrangement path PH.

On the other hand, the second wing 121b includes a pair of guide ribs 125 and 126. The guide ribs 125 and 126 extend in parallel with each other along the downstream side of the arrangement path PH and are spaced away from each other by a distance corresponding to a width of the flat cable F so that the guide ribs 125 and 126 guide the flat cable F folded on the arrangement path PH. A sidewall 125a of the guide rib 125 is contiguous with an end surface 124a of the plate 124. In the illustrated second embodiment, the sidewall 125a serves as a guide surface of a direction-defining section for defining a folding direction of the flat cable F positioned by the first wing 121a. In other words, the first wing 121a serves to position the flat cable F to define a folding angle of the flat cable F in association with the sidewall 125a that serves as a direction-defining section.

A crossing portion 121c, which serves as a cable-receiving portion, is formed on a joining part between the first and second wings 121a and 121b. The crossing portion 121c is open toward the first and second wings 121a and 121b so that the crossing portion 121c can receive the flat cable F at the upstream and downstream sides. Further, the crossing portion 121c is provided with a groove 127 that forms a crease 1c in the flat cable F along a folding line of the flat cable F to be folded. The groove 127 may be inclined at, for example, 45 degrees with respect to the sidewall 125a corresponding to a folding angle θ of the flat cable F.

In the second embodiment, as shown in FIG. 8A, the flat cable F is inserted into the slot 123 in the first wing 121a and is folded to define the folding position. As shown in FIG. 8B, a paddle-like tool 128 pushes the flat cable F along the groove 127 to give the crease 1c to the flat cable. As shown in FIG. 8C, the flat cable F is readily and accurately folded at a given folding angle by folding the downstream flat cable along the crease 1c. Since the folding angle of the flat cable F can be defined by disposing the edge 1a of the folded portion of the flat cable F on the sidewall 125a of the guide rib 125, it is possible to fold the flat cable F without interposing any foreign substances in the folded portion 1b of the flat cable F. Consequently, a folding dimension of the flat cable F becomes more accurate.

By referring to FIG. 7 again, the cable-pinching member 130, which is common to the cable-folding member 120, includes a planar base section 132 that is secured to the drawing board 11 by a supporting pole 131 and a planar slider 133 that is movably mounted on the base section 132. The base section 132 and slider 133 are disposed to oppose the second wing 121b of the cable-folding member 120 through the crossing portion 121c. The slider 133 can move between a releasing position where the slider 133 retracts from the cable-folding member 120 to release the flat cable F, as shown in FIGS. 8A and 8B, and a pinching position where the slider 133 pinches the folded portion of the flat cable F on the crossing portion 121c to cause plastic deformation in the crease of the folded portion. The slider 133 is provided with a slot 133a extending in a longitudinal direction so that the slider moves on the base section 132. The slider 133 is movably coupled to the base section 132 by a pin 134 that passes through the slot 133a. The slider 133 is provided on the bottom surface with a pair of guide grooves 133b extending in parallel with the slot 133a while the base section 132 is provided on the upper surface with a pair of pins 132a that engage the guide grooves 133b slidably. The guide grooves 133a and pins 132a prevent rotation of the slider 133 on the base section 132.

It will be apparent from the foregoing by referring to FIGS. 8A to 8C according to the second embodiment that the folded portion of the flat cable F is pinched between the bottom surface of the slider 133 and the crossing portion 121 to cause plastic deformation in the crease when the slider 133 moves from the releasing position (FIG. 8A) to the pinching position (FIG. 8C) after finishing the folding process.

Since the portion of the crease of the flat cable F folded by the cable-folding member 120 is subject to plastic deformation to be formed into a given shape by the cable-pinching member 130, the dimension of the flat cable F becomes more precise.

The groove 127 may be omitted upon selecting the cable-folding member 120 shown in FIG. 7, if the cable-folding member 120 includes the cable-pinching member 130.

Additionally, the cable-pinching member 130 may be omitted, if the cable-folding member 120 has the groove 127.

A third embodiment will be described below by referring to FIGS. 9 to 12.

FIG. 9 is a perspective view of a cable-folding member and a cable-pinching member according to a third embodiment of the present invention. FIG. 10 is a perspective view of the cable-pinching member shown in FIG. 9, illustrating a rear side of the member. FIG. 11 is a perspective view similar to FIG. 9, illustrating a process for folding the flat cable. FIG. 12 is a longitudinal sectional view of the cable-folding member and cable-pinching member, illustrating a state of pinching the flat cable.

Referring to FIG. 9, a cable-folding member 220 according to the illustrated third embodiment has a polygonal configuration such as a diamond-like configuration. The cable-folding member 220 includes a block body 221 to be secured to the drawing board 11 and a plate 222 to be secured to an upper surface of the block body 221. A shape of the cable-folding member 220 is determined so as to define the folding angle θ of the flat cable F in the folding process. The cable-folding member 220 includes a lower side part 220a extending in parallel with the arrangement path PH of the upstream flat cable F, side end parts 220b formed rectangularly on the opposite ends of the lower side part 220a, inclined parts 220c that are contiguous to the side end parts 220b and are inclined at a given angle symmetrically with respect to the arrangement path PH of the upstream flat cable F, and an upper side part 220d that is contiguous to the inclined parts 220c and extends in parallel with the lower side part 220a.

The block body 221 is provided on a top surface with an upper step surface 221b and a lower step surface 221c that define a vertical surface 221a having a height sufficient to pinch the flat cable F. In the illustrated third embodiment, the vertical surface 221a is parallel with the lower side part 220a and is contiguous to the opposite ends of the side end parts 220b. The vertical surface 221a guides the flat cable F while the lower step surface 221c receives the flat cable F, whereby the flat cable F can be accurately disposed on the arrangement path PH set on the arrangement section 11a of the drawing board 11.

The plate 222 may be constructed of any suitable material such as, for example, a thin metallic sheet. The plate 222 is secured to the top surface of the block body 221 to define a slot 223 between the lower step surface 221c and the bottom surface of the plate 222.

Figure 11A:
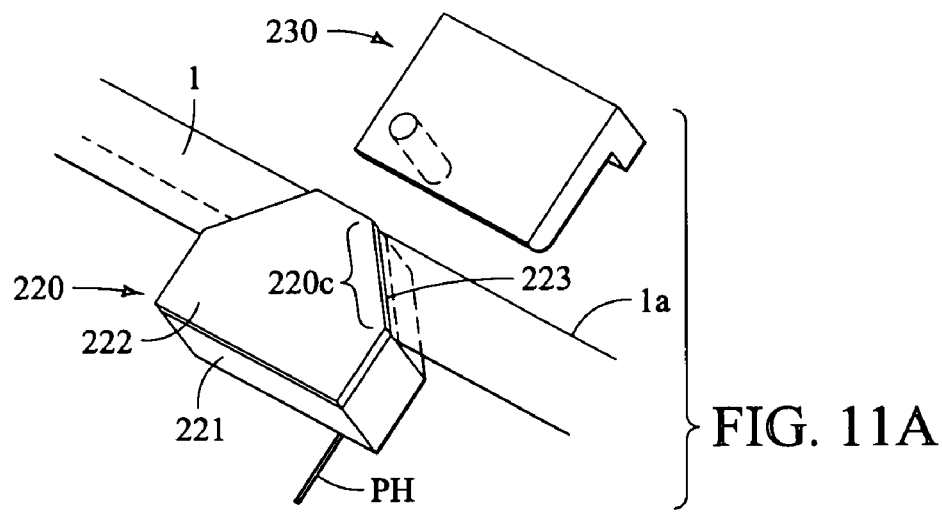
FIGS. 11A, 11B, and 11C are perspective views of the cable folding member and the cable pinching member according to the third embodiment of the present invention, illustrating a process for folding a flat cable.
Figure 11B:
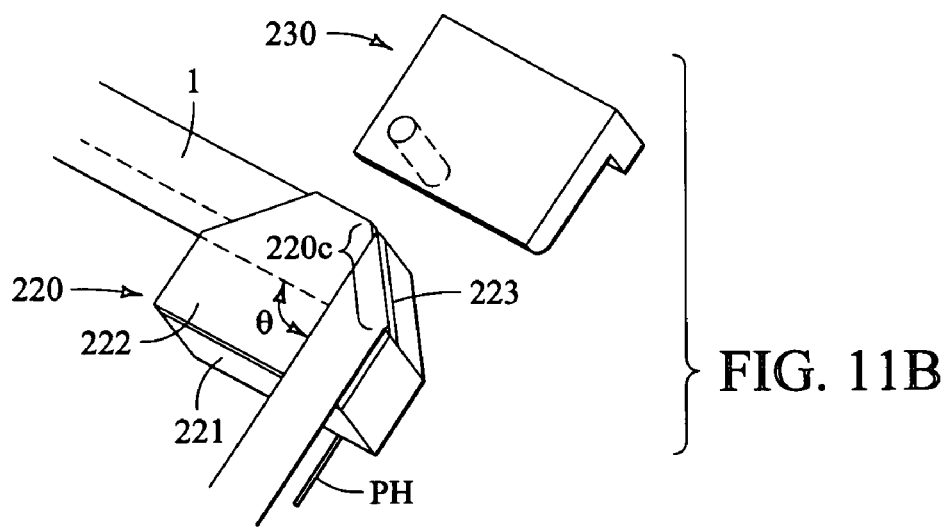
Figure 12:
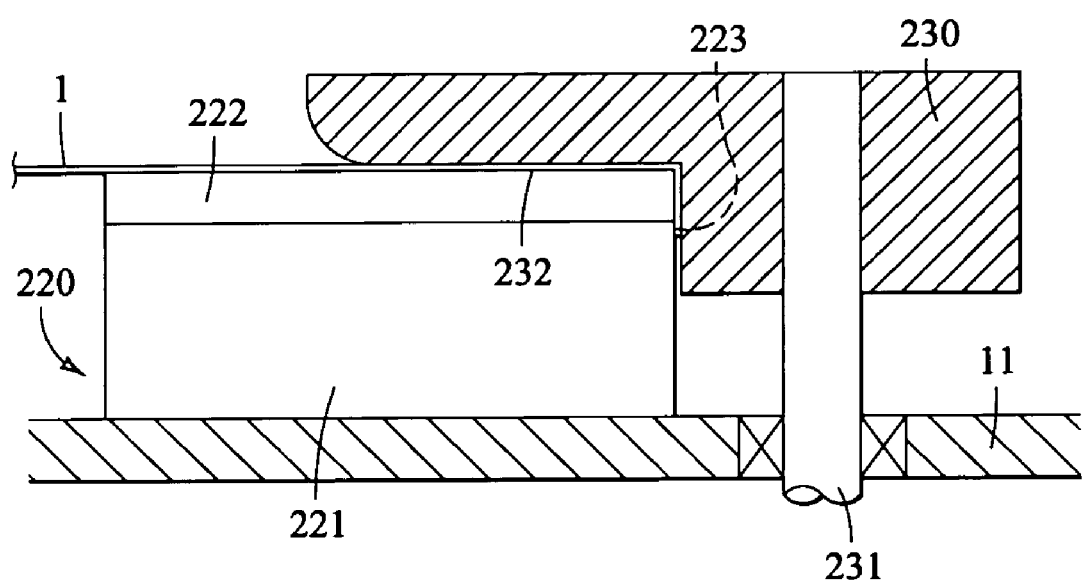
FIG. 12 is a sectional view of the cable-folding member and cable-pinching member according to the third embodiment of the present invention, illustrating a state of pinching the flat cable.

Referring to FIGS. 11A and 11B, the flat cable F inserted in the slot 223 is folded from the downstream side of the arrangement path PH to the top surface of the plate 222 to dispose the folded portion on the inclined part 220c. Thus, the edge of the inclined part 220c of the plate 222 serves as a direction-defining section that defines a folding-direction of the folded flat cable F. Accordingly, the flat cable F can be folded at a given folding angle θ (θ=90 degrees in the illustrated third embodiment) from the upstream side of the arrangement path PH by the inclination angle (45 degrees in the illustrated third embodiment) defined by the inclined part 220c.

Referring to FIGS. 9 and 10, a cable-pinching member 230, which is common to the cable-folding member 220, has a substantially rectangular configuration. The cable pinching member 230 may be constructed from any suitable material such as, for example, a solid molded resin molding material. The cable-pinching member 230 is provided near a corner with a rotary axle 231 that rotatably supports the member 230 on the drawing board 11. The cable-pinching member 230 can move between a releasing position shown in FIG. 9 and a pinching position shown in FIG. 11C.

Referring to FIG. 10, the cable-pinching member 230 is provided on the rear side with a cut-off portion 232 having a given inclined angle. The flat cable folded by the inclined part 220c of the cable-folding member 220 is pinched between a side surface of the cut-off portion 232 and the cable-folding member 220 when the cable-pinching member 230 moves to the pinching position.

Figure 11C:
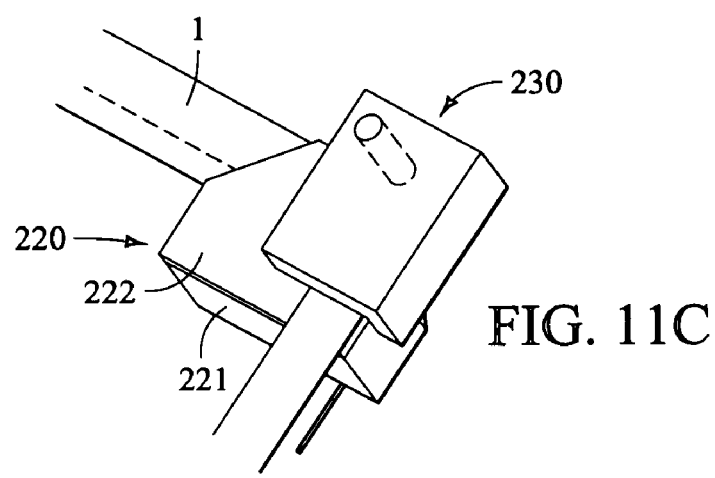

It will be apparent from the foregoing by referring to FIGS. 11A and 11B according to the third embodiment that the folded portion 1b (FIG. 12) of the flat cable F is pinched between the bottom surface of the cut-off portion 232 formed in the cable-pinching member 230 and the inclined part 220c to cause plastic deformation in the crease when the cable-pinching member 230 moves to the pinching position shown in FIG. 11C after finishing the folding process.

Figure 13:
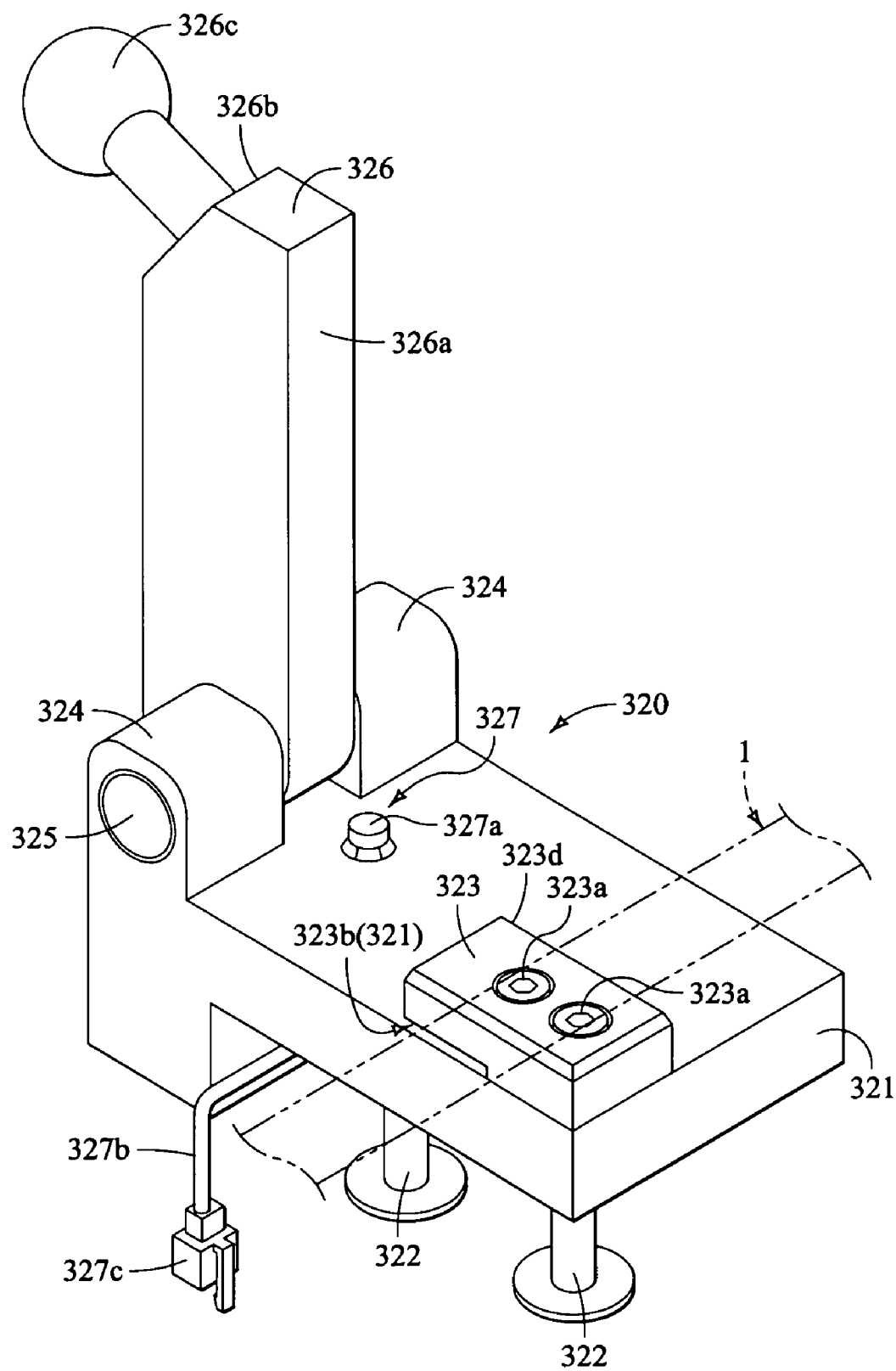
FIG. 13 is a perspective view of a cable-folding member according to a fourth embodiment of the present invention.

Referring further to FIGS. 13 and 14, a fourth embodiment of a cable-folding member 320 will be described below.

Figure 14A:
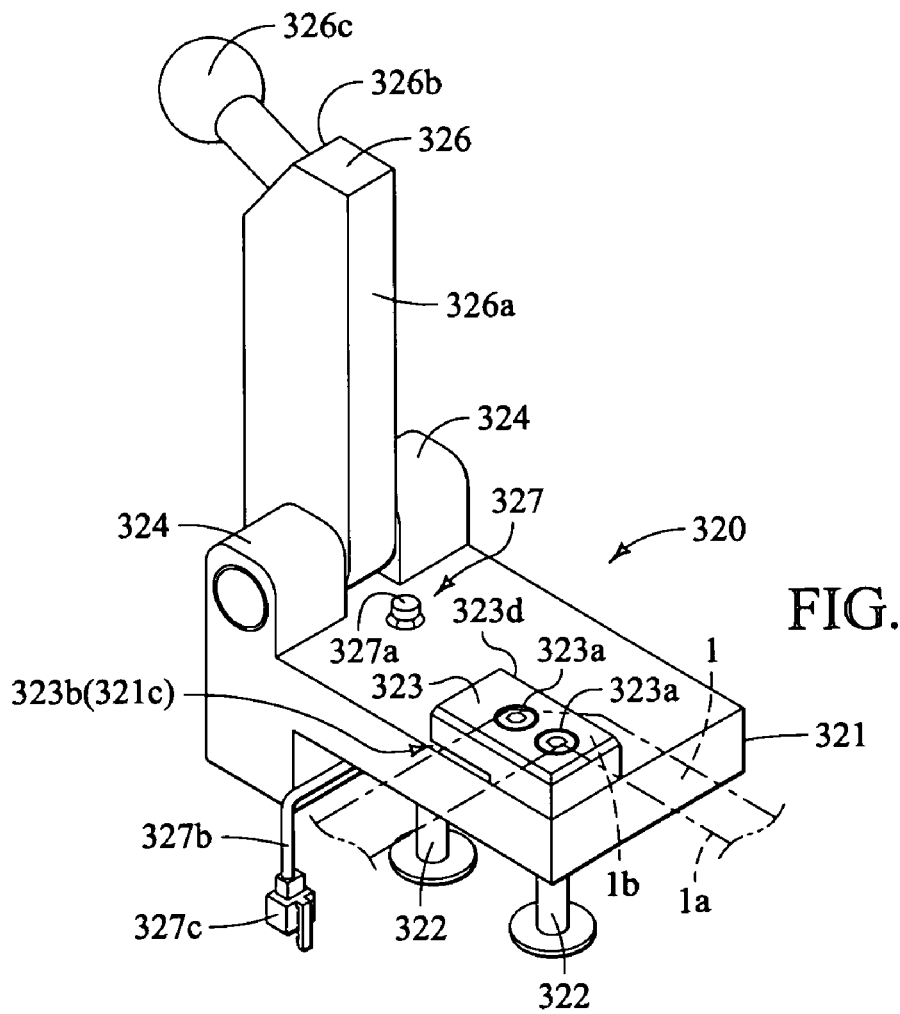
FIGS. 14A is a perspective view of the cable-folding member of the fourth embodiment of the present invention, illustrating operation of the cable-folding member and showing a position before the cable-folding member is actuated.
Figure 14B:
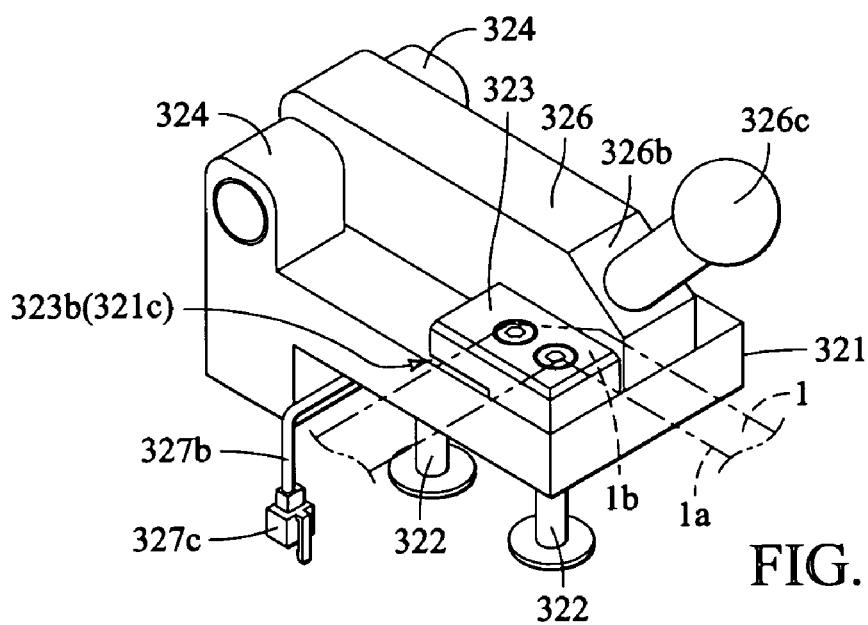
FIG. 14B is a perspective view of the cable folding member of the fourth embodiment of the present invention, illustrating operation of the cable folding member and showing a position after the cable folding member is actuated.

FIG. 13 is a perspective view of a fourth embodiment of a cable-folding member 320. FIG. 14 is a perspective view of the cable-folding member 320 shown in FIG. 13, illustrating an operation of the cable-folding member 320. FIG. 14A shows a position before the cable-folding member 320 is actuated and FIG. 14B shows a position after the member 320 is actuated.

Referring to FIG. 13, the cable-folding member 320 includes a base block 321 that serves as a mounting table. The base block 321 is formed into a substantially rectangular plate constructed of any suitable material such as, for example, a synthetic resin material. The base block 321 is secured to the drawing board 11 on the arrangement path PH of the flat cable F by a pair of supporting poles 322 standing on the drawing board 11.

A positioning block 323, which serves as a positioning section to dispose the flat cable F on the arrangement path PH, is fixed on a longitudinal end of the base block 321 by a pair of bolts 323a. The positioning block 323 is formed into a rectangular solid body made of any suitable material such as, for example, a transparent synthetic resin material. The positioning block 323 is provided on the bottom surface with a cut-off portion 323b. A slot 321c is defined between the cut-off portion 323b and an upper surface of the base block 321. When the flat cable F is inserted into the slot 321c, the flat cable F is positioned on the arrangement path PH.

The positioning block 323 is disposed on and secured to the upper surface of the base block 321 so that longitudinal side surfaces of the base block 321 and positioning block 323 are aligned on the same plane. The side surface including the other longitudinal side surface of the positioning block 323 serves as a guide surface 323d that defines a folding angle of the flat cable F.

The base block 321 is provided on the other longitudinal end with a pair of supporting portions 324. The supporting portions 324 are provided on the opposite lateral ends of the base block 321. A driving axle 325 extends in a lateral direction of the base block 321 to couple the supporting portions 324 to each other. An end of a driving block 326 that serves as a pressing device is interposed between the supporting portions 326 and supported rotatably on the driving axle 325. The driving block 326 is a substantially rectangular solid body made of a metallic material or the like. When the driving block 326 is rotated about the driving axle 325, a bottom surface of the driving block 326 is opposed to the upper surface of the base block 321. The bottom surface of the driving block 326 serves as a pressing surface 326a that presses the flat cable F.

The driving block 326 is provided on the surface opposite from the pressing surface 326a and on the end opposite from the end coupled to the driving axle 325 with an inclined portion 326b. A handle 326c stands in a normal direction on the slant portion 326b.

When the driving block 326 is rotated clockwise (as shown in the drawings), the pressing surface 326a comes into contact with the upper surface of the base block 321. A switch 327 is provided at a contact position with the pressing surface 326a on the base block 321. The switch 327 includes a sleeve (not shown) fixed on the base block 321. A movable pin 327 is slidably inserted in the fixed sleeve. The movable pin 327 projects upwardly from the base block 321. When the pressing surface 326a of the driving block 326 presses the movable pin 327, the pin 327 is moved to the position aligned with the upper surface of the base block 321. Then, the switch 327 is brought into contact with an electric contact (not shown) to generate a given electric signal (hereinafter referred to "ON position"). The electric signal is transmitted to a well known inspection apparatus (not shown) through an electric wire 327b an end of which is connected to a lower end of the fixed sleeve and through a connector 327c connected to the other end of the electric wire 327b.

The cable-folding member 320 folds the flat cable F through the following steps.

Referring to FIG. 14A, a worker inserts the flat cable F into the slot 321c and positions the flat cable F on the base block 321. Then, the worker folds the flat cable F to form the folded portion 1b so that the edge 1a of the flat cable F extends along the guide surface 323d. The worker holds the flat cable F at the downstream side to maintain the folded portion 1b. Under the present condition, the worker holds the handle 326c and turns the driving block 326.

Referring to FIG. 14B, when the driving block 326 is turned, the folded portion 1b of the flat cable F is pressed between the base block 321 and the pressing surface 326a, that is, the driving block 326 is moved to the pressing position. This pressing action causes plastic deformation in the crease of the flat cable F.

When the driving block 326 is rotated, the pressing surface 326a turns the switch 327 ON to generate a given electric signal. In response to the electric signal, the inspection apparatus (not shown) generates a buzzer sound or the like to inform the worker that the folding work is normally completed. In the case where a single flat cable F is folded at a plurality of positions, the inspection apparatus is connected to corresponding plural cable-folding members 320 and decides whether each folding work is finished or not at every folding position. After all the folding process is finished, the inspection apparatus informs the same to the operator.

After all the folding process is completed, the operator holds the handle 326c and turns the driving block 326 to the detachable position shown in FIG. 14A. Then, the operator removes the flat cable F from the slot 321c and inserts a new flat cable F into the slot 321c.

The cable-folding member 320 constructed as described above can fold the flat cable F on the base block 321 with respect to the positioning block 323. The folded flat cable F is pressed between the base block 321 and the pressing surface 326a by turning the driving block 326. Accordingly, the operator can cause plastic deformation in the crease of the flat cable F.

Since the cable-folding member 320 includes the switch 327 and inspection apparatus, it is possible to prevent the worker from making a mistake in omitting the folding process, thereby easily causing plastic deformation in the crease of the flat cable F.

It should be noted that the above embodiments illustrate merely preferable examples and the present invention is not limited to the above embodiments. Various changes in design can be carried out in the scope of the claims.

It will be apparent from the foregoing according to the present invention that it is possible to accurately define the folding angle of the flat cable by the direction-defining section and the positioning section of the cable-folding member secured to the drawing board and it is possible to efficiently carry out the folding process. In particular, the invention has the advantage of eliminating a marking process, since the connector holder attached to the drawing board can accurately define the arranging and folding positions of the flat cable.

Figure 17:
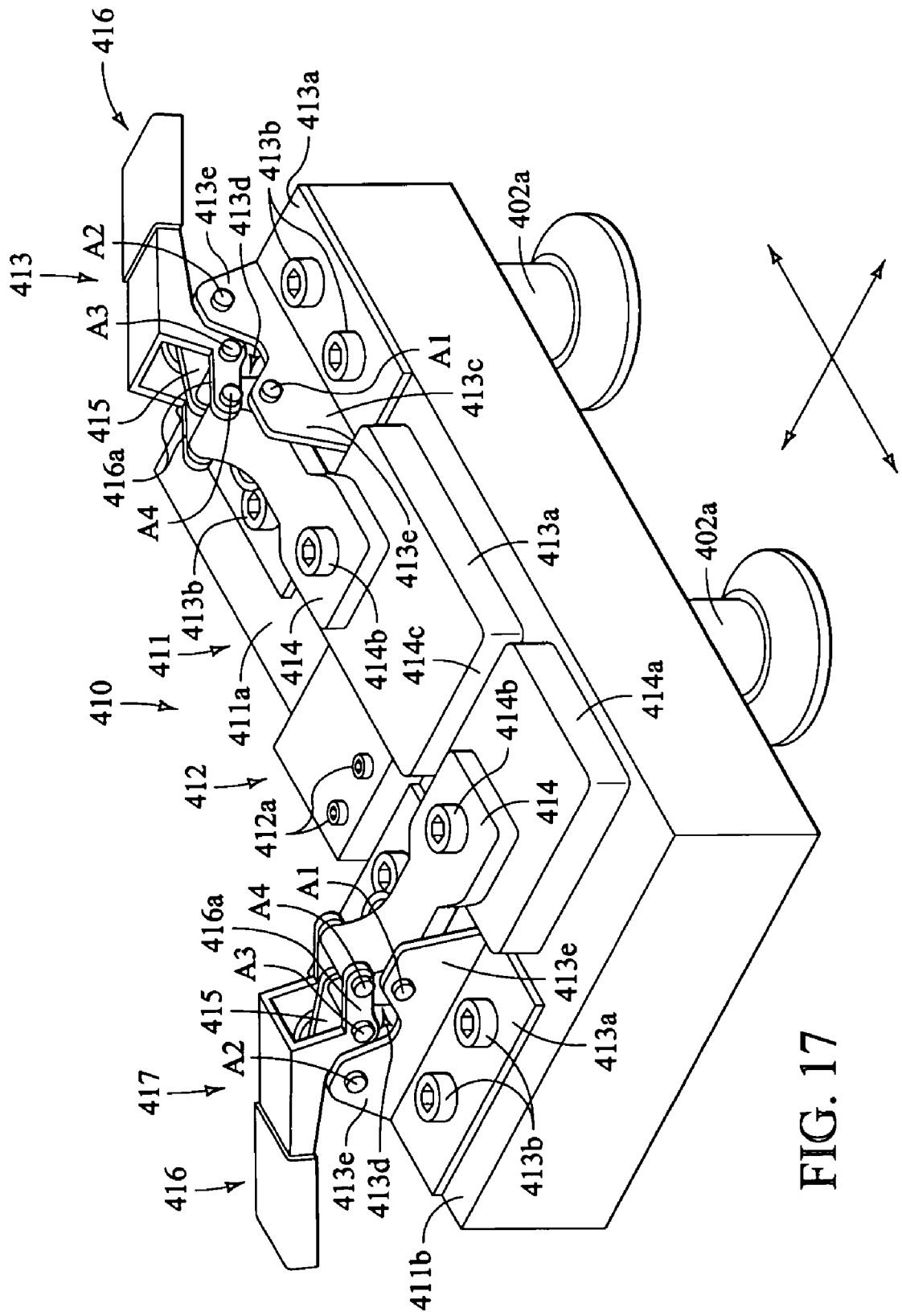
FIG. 17 is a partially enlarged perspective view of a successive folding apparatus on the production drawing board according to the embodiment of FIG. 15.

FIG. 17 is a schematic perspective view of a production drawing board 401 for a flat cable F in a fifth embodiment of the present invention.

Referring to FIG. 17, the producing drawing board 401 includes a drawing board body 402. The drawing board body 402 is an inclined working-table that an operator can face by looking downwardly. The flat cable F is disposed along an arrangement path PH1 on the drawing board body 402. For convenience of explanation, an operator's side of the drawing board body 402 is defined as a "front side" and right and left sides in a longitudinal direction on the drawing board body 402 are defined as "right and left sides", respectively.

In the illustrated embodiment, a connector C is connected to an end of the flat cable F and a connector holder 403 is positioned at a position corresponding to the connector C on the arrangement path PH1 on the drawing board body 402. A plurality of holding members 404 are disposed at positions corresponding to the arrangement path PH1 on the drawing board body 402.

Figure 16:
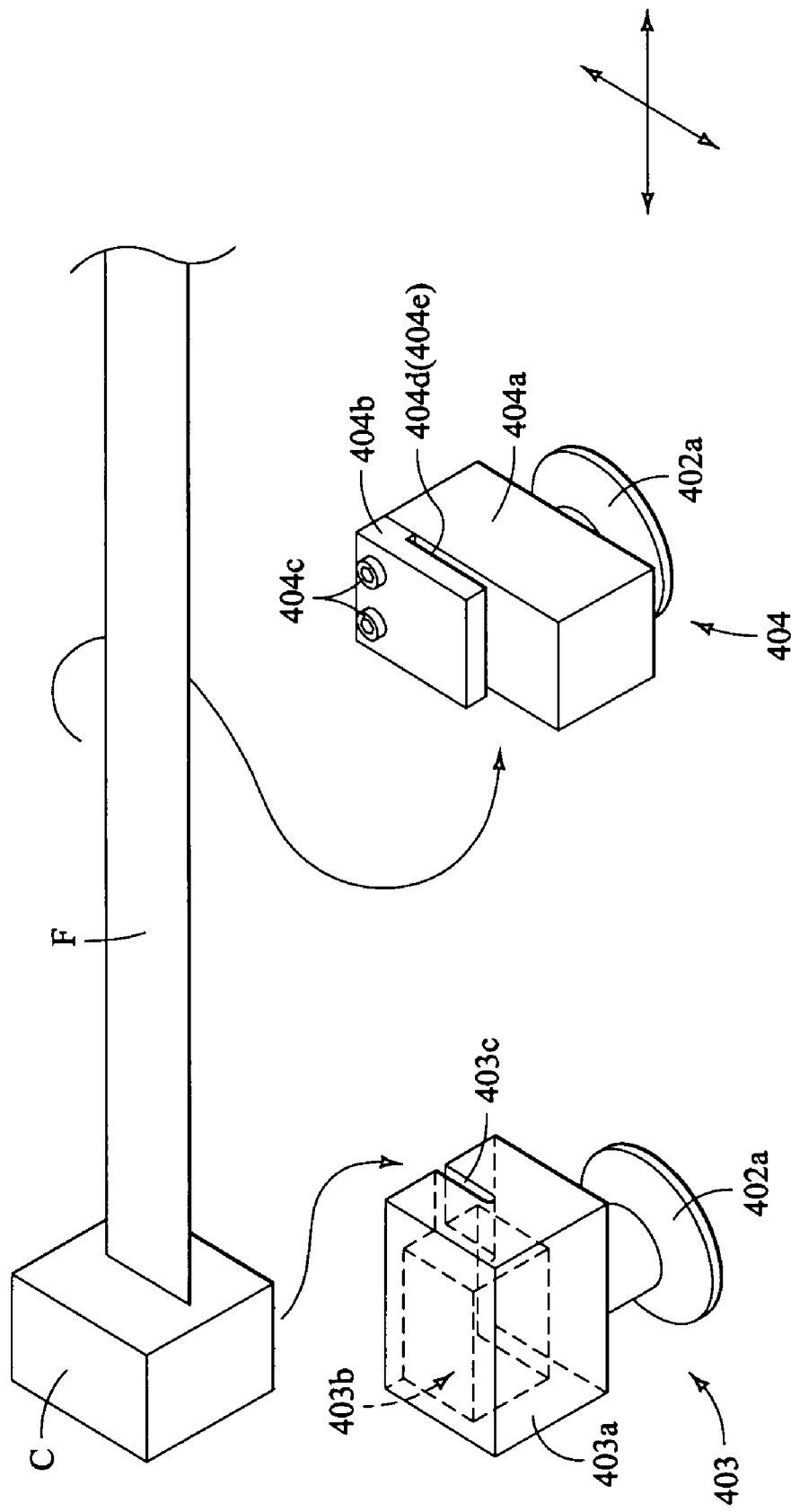
FIG. 16 is a schematic perspective view of a connector holder and a holding member on the production drawing board according to the embodiment of FIG. 15.

FIG. 16 is a schematic perspective view of the connector holder 403 and holding member 404 on the drawing board 401.

Figure 15:
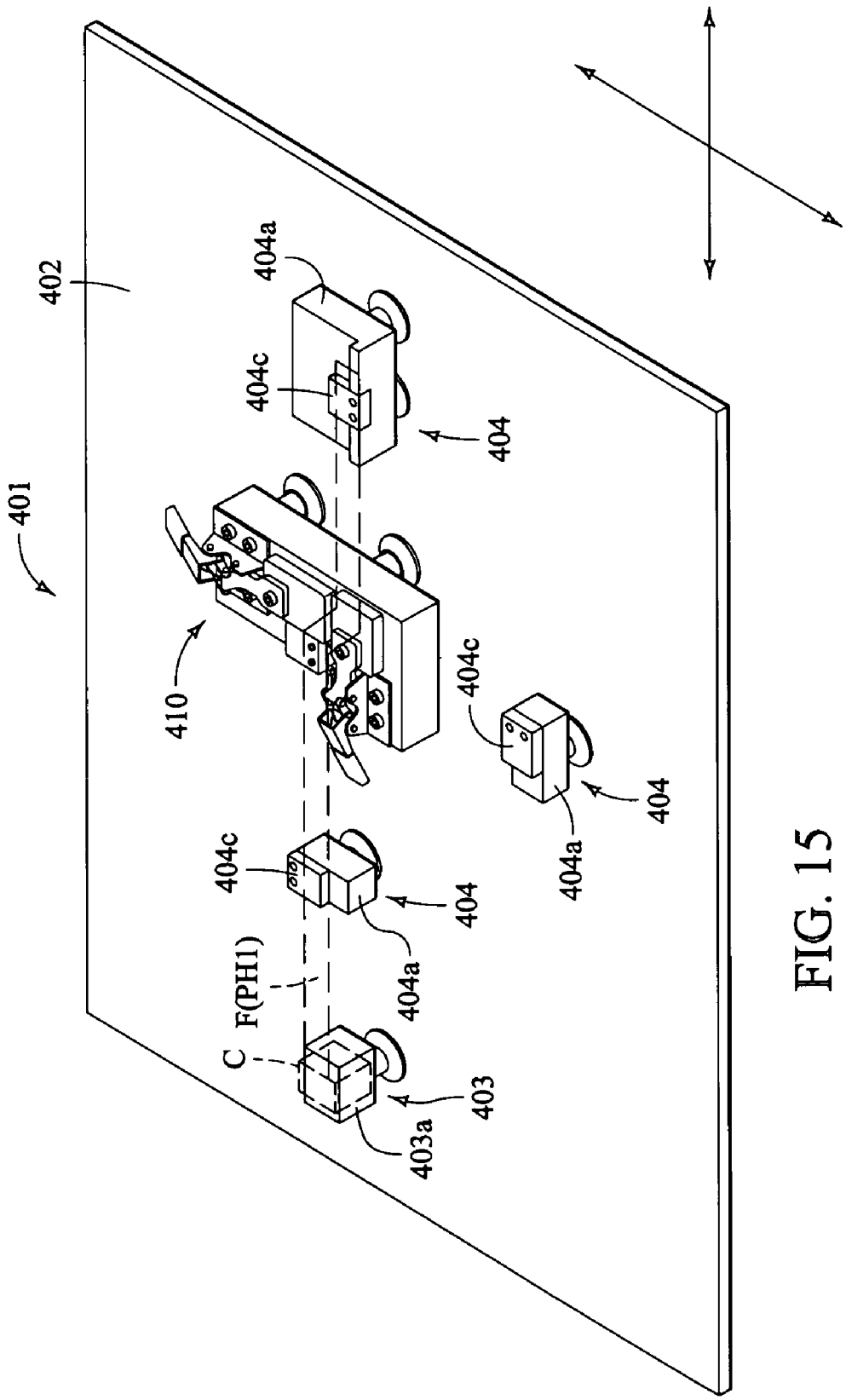
FIG. 15 is a schematic perspective view of a production drawing board for a flat cable according to a fifth embodiment of the present invention.

Referring to FIGS. 15 and 16, the connector holder 403 includes a holder block 403a. The holder block 403a is a substantially rectangular body and may be constructed of any suitable material such as, for example, a synthetic resin material or the like. Further, the holder block 403a may be configured as a solid body. The holder block 403a is secured to the drawing board body 402 by a supporting pole 402a standing on the drawing board body 402. The holder block 403a is provided with a containing hole 403b for accommodating the connector C. The containing hole 403b is open on the left side and rear side so that the connector C can be detachably inserted therein. Moreover, the holder block 403a is provided with a containing groove 403c that extends from the right side surface thereof to the containing hole 403b. The containing groove 403c is open on the rear side and extends in the right and left side directions. The width and depth of the containing groove 403c are determined in accordance with the thickness and width of the flat cable F to contain the flat cable F. When the connector C is attached to the connector holder 403, the flat cable F connected to the connector C is accommodated in the containing groove 403c. In the present (fifth) embodiment, since the flat cable F is arranged from the side of the connector C, the side of the connector C on the arranged flat cable F is hereinafter defined to be as the "upstream side".

The holding member 404 is positioned on the downstream side from the connector holder 403 and includes a holding base 404a. The holding base 404a may be a substantially rectangular body and may be constructed of any suitable material such as, for example, a synthetic resin material or the like. Further, the body of the holding base 404a may be configured as a solid body. The holding base 404a is secured to the drawing board 402 by the supporting pole 402a extending from the drawing board body 402. A holding piece 404b is secured to an upper surface of the holding base 404a. The holding piece 404b may be secured to the upper surface of the holding base 404a by any suitable holding device such as, for example, by a pair of bolts 404c. The holding piece 404b is a planar element and may be made of any suitable material such as, for example, a synthetic resin material or the like. Further, the holding piece 404b may be transparent. The holding piece 404b is provided on the rear surface thereof with a cut-off portion 404d. The cut-off portion 404d and upper surface of the holding base 404a define a slot 404e. The slot 404e is open toward the front side and extends in the right and left side directions. The width and depth of the slot 404e are determined in accordance with the thickness and width of the flat cable F to contain the flat cable F. The holding member 404 contains the flat cable F from the front side along the arrangement path PH1 on the drawing board body 402.

The flat cable F is disposed along the arrangement path PH1 on the drawing board body 402 by the connector holder 403 and holding member 404 described above. In the present (fifth) embodiment, the arrangement path PH1 is set to turn downwardly at the downstream side from the connector holder 403 and to turn to the right side at a position near the downstream side from the connector holder 403 (that is, successive folding positions of the flat cable F are arranged). A successive folding apparatus 410 is disposed at each of the successive folding positions on the drawing board body 402.

Figure 18:
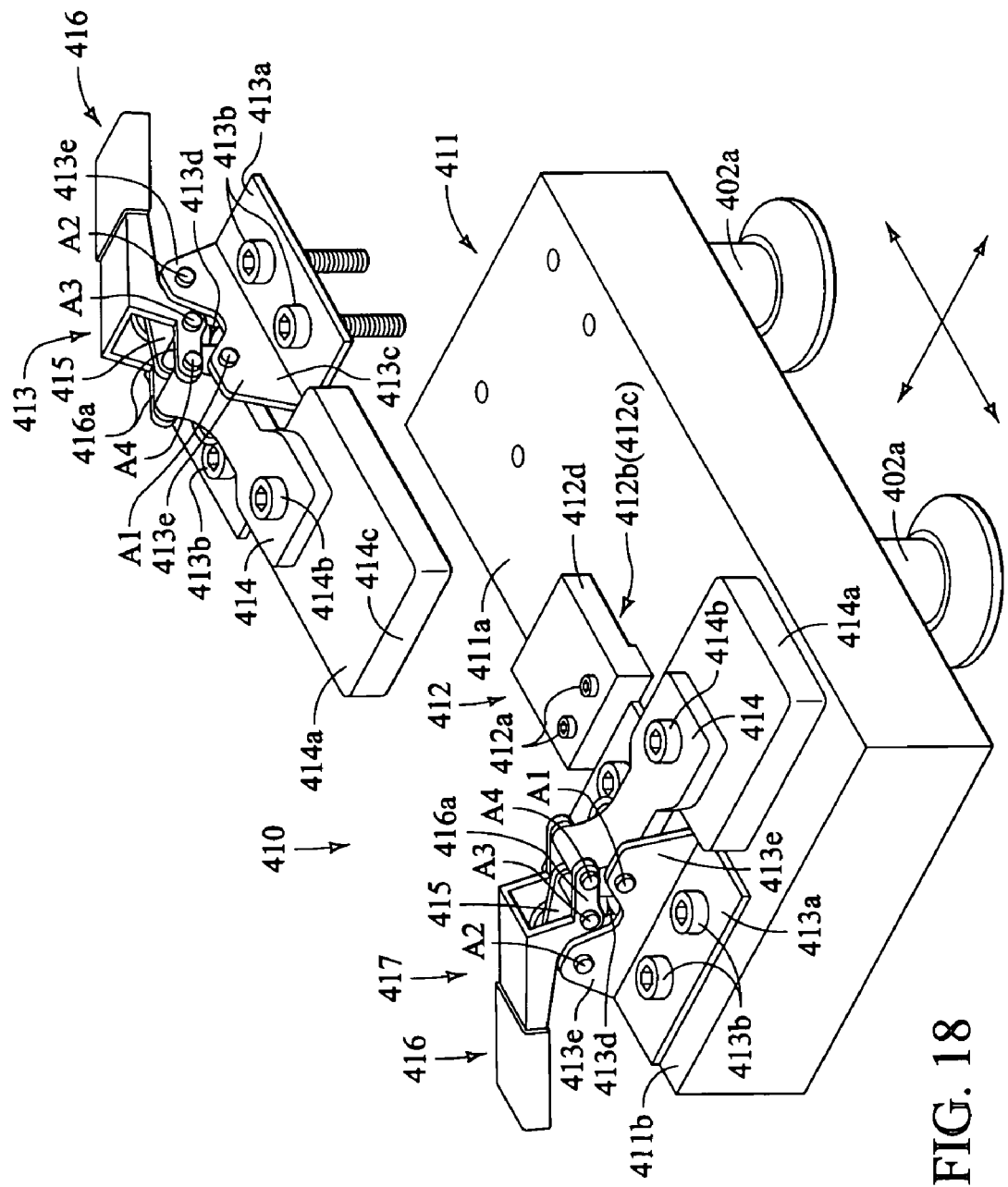
FIG. 18 is a partially enlarged and exploded perspective view of the successive folding apparatus shown in FIG. 17.

FIG. 17 is an enlarged perspective view of the successive folding apparatus 410 on the production drawing board 401 shown in FIG. 15. FIG. 18 is an enlarged and exploded perspective view of the successive folding apparatus 410 shown in FIG. 17.

Referring to FIGS. 17 and 18, the successive folding apparatus 410 is positioned on the downstream of the connector holder 403 and includes a base 411. The base 411 may be made of any suitable material such as, for example, a metallic material or the like. The base 411 includes a longitudinal portion 411a extending in the front and rear directions and a projecting portion 411b extending in the left direction from the front end of the longitudinal portion 411a to form an L-shaped block. The base 411 is supported or fixed on the drawing board body 402 by supporting poles 402a extending from the drawing board body 402.

A positioning block 412 is provided on a left end of the longitudinal portion 411a to hold the flat cable F along the arrangement path PH1 and to position the flat cable F on the base 411. The positioning block 412 is a planar element and may be made of any suitable material such as, for example, a synthetic resin material or the like. Further, the positioning block 412 may be transparent. The positioning block may be secured to the base by any suitable securing device and in the present embodiment is secured to the base 411 by a pair of bolts 412a. The positioning block 412 is provided on the rear surface thereof with a cut-off portion 412b. The cut-off portion 412b and an upper surface of the base 411 define a slot 412c. The slot 412c is open in the rear direction and extends in the right and left directions. The width and depth of the slot 412c are determined in accordance with the thickness and width of the flat cable F to hold the flat cable F on the base 411 with the flat cable F being positioned on the base 411.

Also, in the present embodiment, a first direction-defining surface or section 412d is provided on the right side surface of the positioning block 412 to define a folding angle of the first of a plurality of working positions of the flat cable F. When the flat cable F held in the slot 412c is folded along the first direction-defining surface 412d, the flat cable F is folded along the arrangement path PH1.

A pressing and securing unit 413 is provided on a rear end of the longitudinal portion 411a. The pressing and securing unit 413 includes a pressing base 413a. The pressing base 413a is a planar element and may be made of any suitable material such as, for example, a metallic material or the like. The pressing base 413a may be fixed on the base 411 by any suitable fixing device and in the present embodiment is fixed to the base 411 by a pair of bolts 413b at the right and left ends thereof. A pair of supporting plates 413c extending rearwardly are provided at a substantially central position of the pressing base 413a in the right and left directions. A supporting recess 413d is provided on a substantially central portion of each supporting plate 413c. A pair of supporting projections 413e are provided at the front and rear of the supporting recesses 413d. An axle A1 extending in the right and left directions is supported in the front side supporting projection 413e. A proximal end of a driving arm 414 is mounted rotatably on the axle A1 between the supporting projections 413e. An axle A2 extending in the right and left directions is supported on the rear side supporting projection 413. An end of a link element 415 is mounted rotatably on the axle A2 between the supporting projections 413e. An axle A3 extending in the right and left directions is supported on the link element 415. A driving element 416 is supported on the axle A3. A pair of actuating parts 416a are provided on the driving element 416. A proximal end of each actuating part 416a is supported on the axle A3. A distal end of each actuating part 416a supports an axle A4 extending in the right and left directions. The driving arm 414 is rotatably mounted on the axle A4 between the actuating parts 416a. These axles A1 to A4, driving arm 414, link elements 415, and driving element 416 together form a driving mechanism.

Figure 19A:
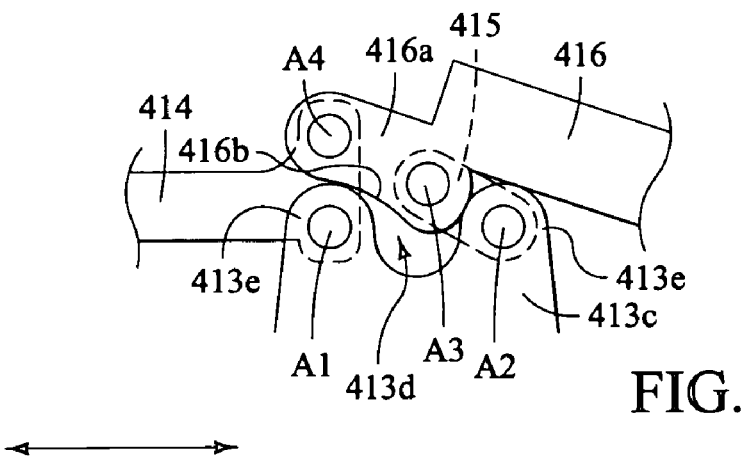
FIG. 19A is a partially enlarged side view of the pressing and securing unit shown in FIG. 17, illustrating operation of the driving mechanism of the unit in a position shown in FIG. 4.
Figure 19B:
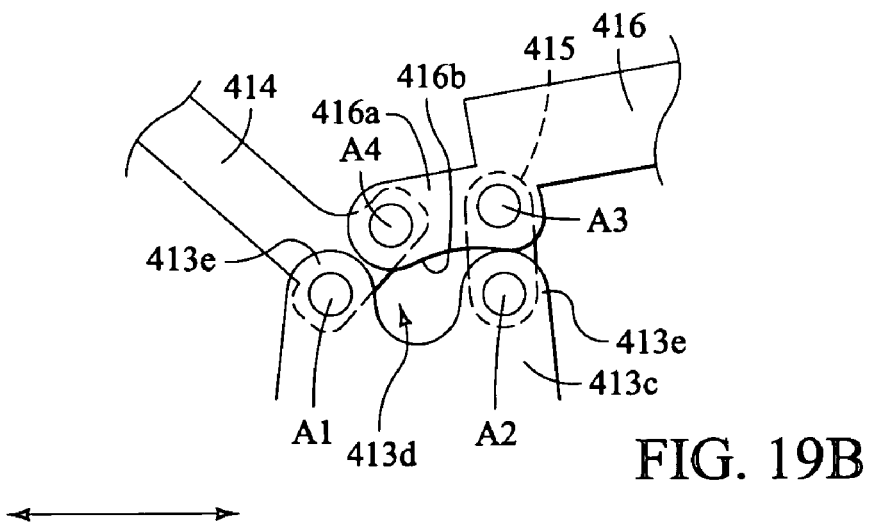
FIG. 19B is a partially enlarged side view of the pressing and securing unit shown in FIG. 17, illustrating operation of the driving mechanism wherein the driving element is rotated a small amount.
Figure 19C:
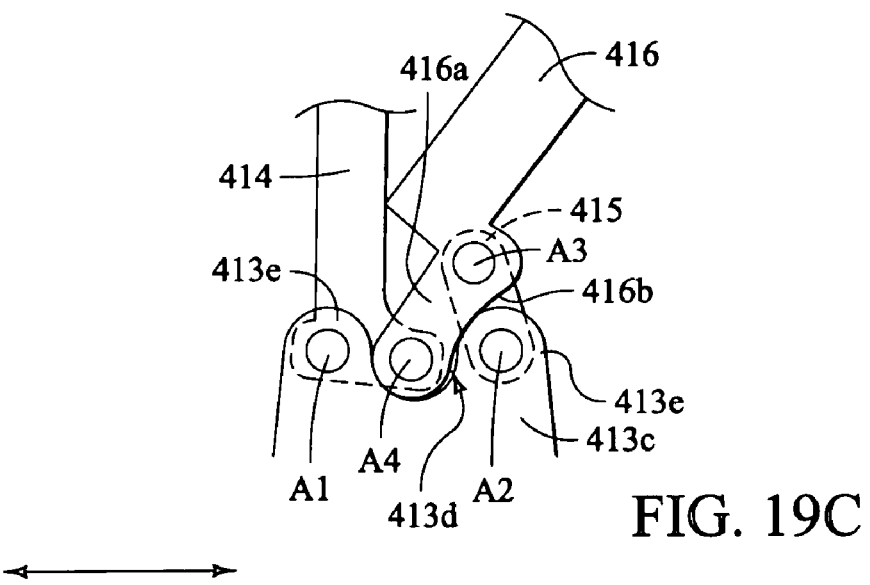
FIG. 19C is a partially enlarged side view of the pressing an securing unit shown in FIG. 17, illustrating operation of the driving mechanism wherein the driving element is rotated completely.

FIGS. 19A, 19B, and 19C are enlarged side elevation views of the pressing and securing unit 413 shown in FIGS. 17 and 18, illustrating the operation of the driving mechanism. FIG. 19A illustrates the position shown in FIGS. 17 and 18, FIG. 19B illustrates a position where the driving element is partially swung, and FIG. 19C illustrates a position where the driving element is swung completely.

Referring to FIG. 19A, each actuating part 416a is provided on a lower surface thereof between the axles A3 and A4 with a curved guide surface 416b. In the illustrated position, the front supporting projection 413e applies a force to the curved guide surface 416b to move the actuating part 416a toward the rear. This force becomes a reaction force that swings the driving element 416 about the axle A4. That is, the driving element 416 is subject to a force that swings the element 416 in the clockwise direction in FIG. 19A about the axle A4. However, since the lower surface of the driving element 416 comes into contact with the upper surface of the rear supporting projection 413e, the driving element 416 is constrained from swinging and the rear supporting projection 413e locks the driving element 416.

Referring to FIG. 19B, when the driving element 416 is rotated in the counterclockwise direction in FIG. 19A, the front supporting projection 413e is released from the curved guide surface 416b in association with the respective axles A1 to A4. This rotating action moves the end of the actuating part 416a at the side of the axle A4, thereby rotating the driving arm 414 about the axle A1 in the clockwise direction in FIG. 19B.

Referring to FIG. 19C, when the driving element 416 is further rotated, the driving arm 414 is further turned about the axle A1 in the clockwise direction in FIG. 19C. This rotating action causes the end of the actuating part 416a at the side of the axle A4 to be moved into the supporting recess 413d, thereby locking the driving element 416.

In the driving mechanism described above, the driving arm 414 to be driven is provided on the distal end thereof with a pressing plate 414a.

Referring to FIGS. 17 and 18, the pressing plate 414a is a planar element and may be made of any suitable material such as, for example, a metallic material or the like. The pressing plate 414a may be secured to the driving arm 414 by any suitable securing device and in the present embodiment is secured to the driving arm 414 by a bolt 14b at an end thereof. In the present embodiment, a side surface of the other end of the pressing plate 414a (the front side surface in the illustrated position) defines a second direction-defining surface or section 414c that defines a folding angle of the second working position of the flat cable F. In the illustrated position, the left side surface of the pressing plate 414a is provided adjacent the right side surface of the positioning block 412 while the bottom surface of the pressing plate 414a is configured to come into contact with the upper surface of the base 411.

A pressing unit 417 is provided on the projecting portion 411b of the base 411. The pressing unit 417 has substantially the same structure as that of the pressing and securing unit 413. Accordingly, the respective reference numerals of the pressing and securing unit 413 are the same as in the pressing unit 417 and thus the explanation of the structure of the unit 417 will be omitted here. The pressing unit 417 may be secured to the base 411 by the bolts 413b so that the unit 417 positions the driving element 416 on the left side of the base 411. In the illustrated position, the rear side end surface of the pressing plate 414a is positioned adjacent the second direction-defining surface 414c of the pressing and securing unit 413. The bottom surface of the pressing plate 414a is positioned to come into contact with the upper surface of the base 411.

An operator performs a successive folding operation of the flat cable F by using the successive folding apparatus 410 described above in the following steps.

Figure 20:
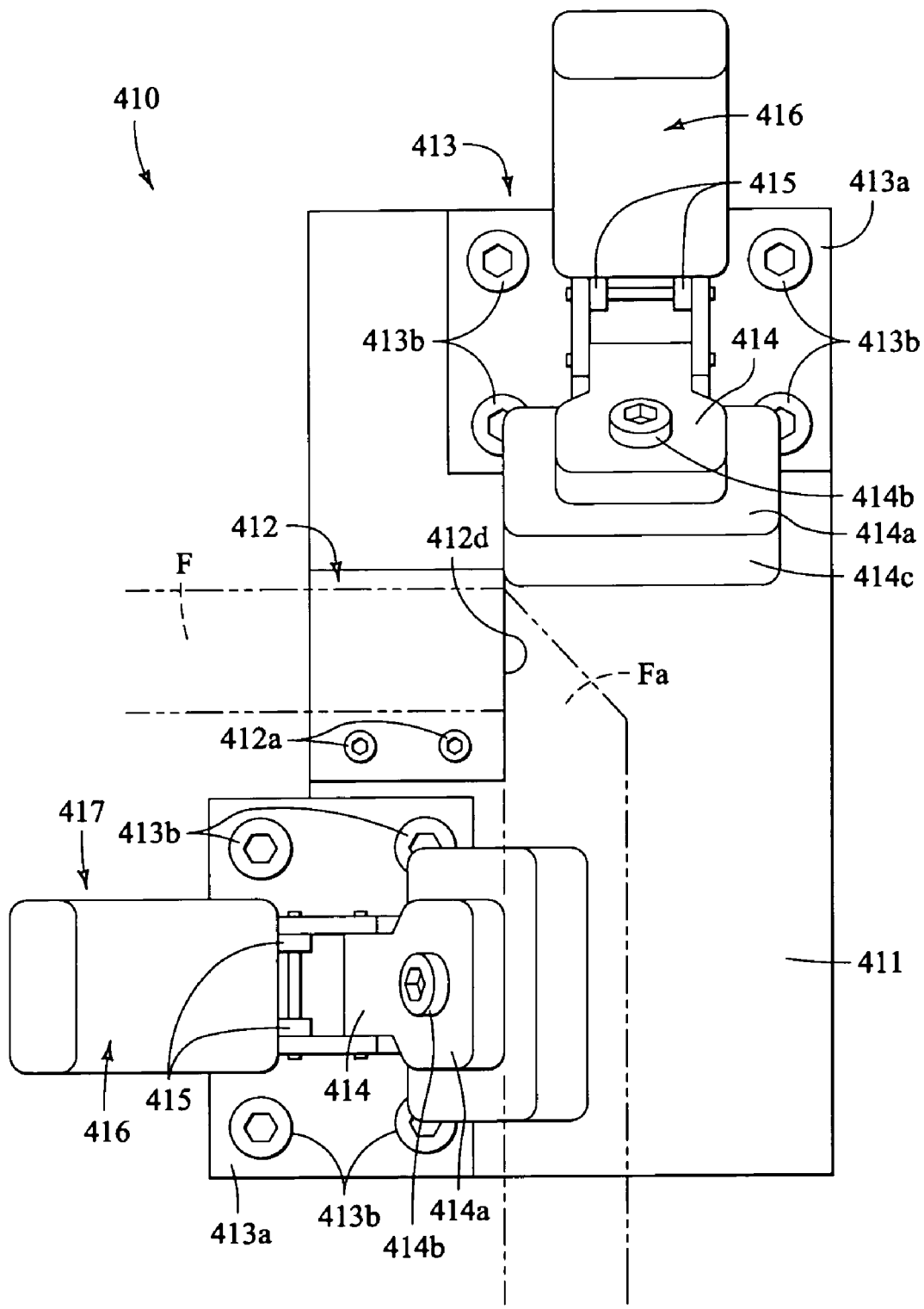
FIG. 20 is a top plan view of the successive folding apparatus shown in FIG. 17, illustrating a working position of the apparatus.
Figure 21:
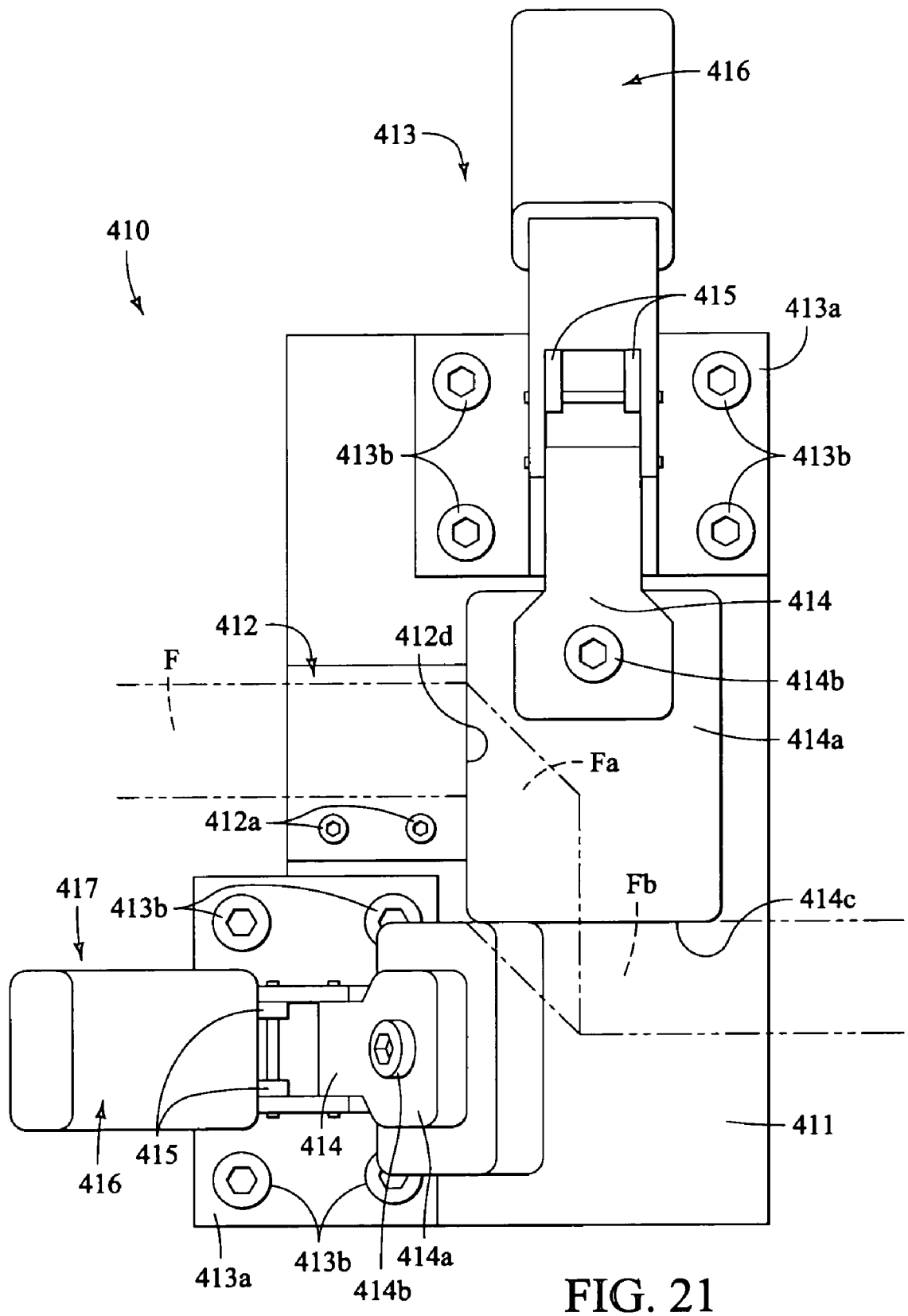
FIG. 21 is a top plan view of the successive folding apparatus shown in FIG. 17, illustrating a working position of the apparatus.
Figure 22:
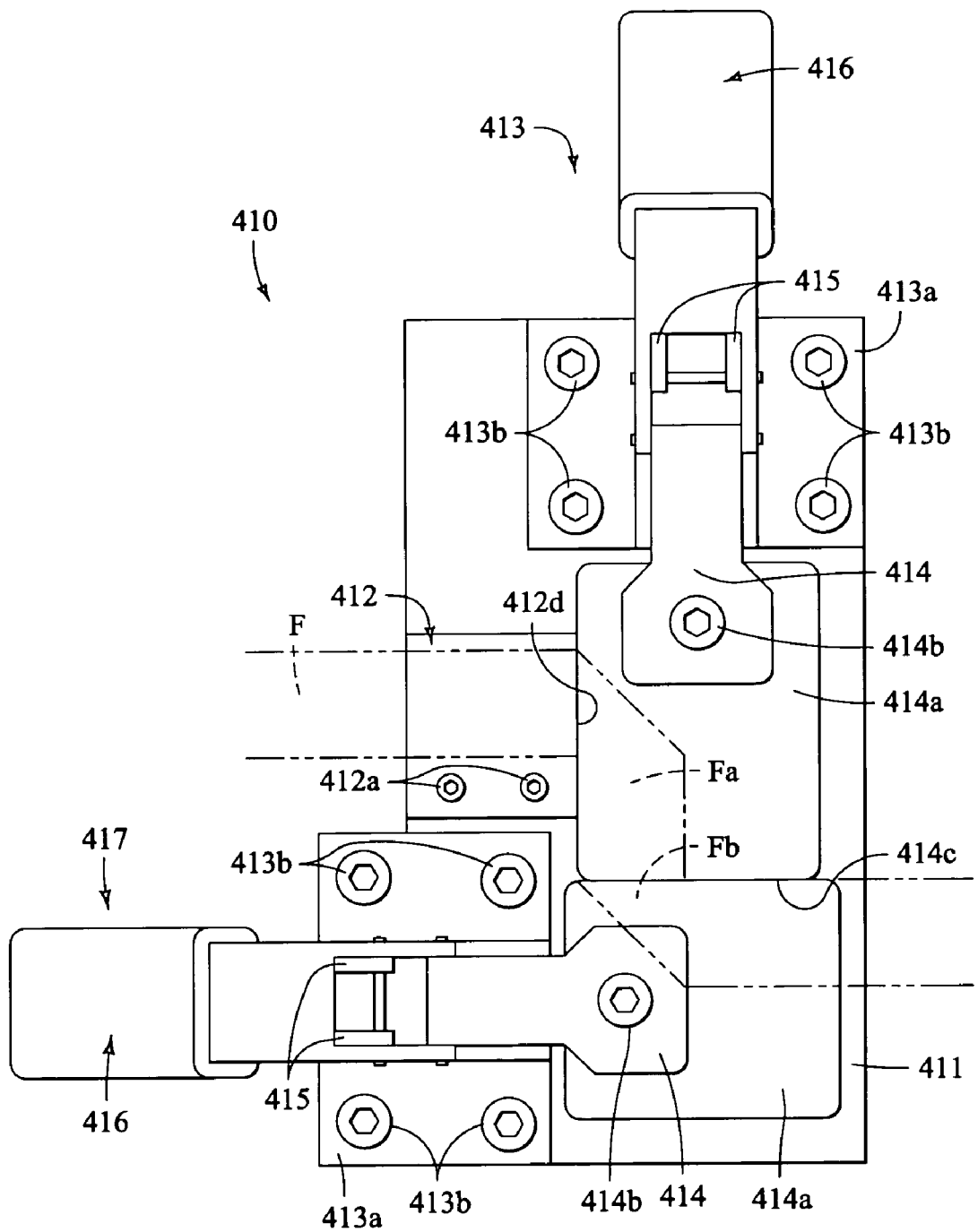
FIG. 22 is a top plan view of the successive folding apparatus shown in FIG. 17, illustrating a working position of the apparatus.

FIGS. 20, 21, and 22 are top plan views of the successive folding apparatus 410, illustrating the respective working positions.

Referring to FIG. 20, the driving arms 414 of the pressing and securing unit 413 and pressing unit 417 are rotated upwardly (FIG. 19C) and the pressing plates 414a are driven upwardly to a "releasing position". Then, the operator inserts the flat cable F into the slot 412c in the positioning block 412 and positions the flat cable F on the base 411 with the flat cable F being positioned (hereinafter referred to as the positioning step). Next, the operator folds the flat cable F along the first direction-defining surface 412d at the downstream side thereof to form the folded portion Fa.

Referring to FIG. 21, the operator downwardly rotates the driving element 416 of the pressing and securing unit 413 (FIG. 19A) to drive the pressing plate 414a to a contact position with the base 411 (hereinafter referred to as a "pressing position"). The driven pressing plate 414a presses the folded portion Fa between the base 411 and the plate 414a to cause plastic deformation in the folded portion Fa (hereinafter referred to as the pressing and securing step). As described above, the driving element 416 is locked in the pressing position, thereby locking the pressing plate 414a in the pressing position. That is, the flat cable F pressed between the base 411 and pressing plate 414a is positioned on the base 411. Then, the operator folds the flat cable F along the second direction-defining surface 414c to form the folded portion Fb.

Referring to FIG. 22, the operator downwardly swings the driving element 416 of the pressing unit 417 to the pressing position. The folded portion Fb is pressed between the pressing plate 414a of the pressing unit 417 and the base 411 to cause plastic deformation in the folded portion Fb (pressing step). After causing plastic deformation in the folded portions Fa and Fb of the flat cable F, the worker displaces the pressing and securing unit 413 and pressing unit 417 to their releasing positions, removes the flat cable F from the base 411, and mounts the next flat cable F to be worked upon onto the drawing board body 402.

In the successive folding apparatus 410 described above, the flat cable F, which is positioned on the base 411 by the positioning block 412, is folded by the first direction-defining surface 412d with the folding angle being defined. The pressing and securing unit 413 causes plastic deformation in the folded portion Fa. Thus, it is possible to enhance accuracies in dimension and operation at the first working position of the flat cable F.

The pressed flat cable F is secured to the base 411 by the pressing and securing unit 413. The secured flat cable F is folded by the second direction-defining surface 414c with the folding angle of the flat cable F being defined. The folded portion Fb is subject to plastic deformation by the pressing plate 414a. Consequently, it is possible to enhance accuracies in dimension and operation in the second working position of the flat cable F.

Further, since the flat cable F, which is pressed at the first working position, is secured to the base 411 by the pressing and securing unit 413, the operator easily folds the flat cable at the second working position.

It is possible to enhance accuracies in dimension and operation and to efficiently carry out the successive folding operation of the flat cable F by utilizing the successive folding apparatus 410 and production drawing board 401 provided in the apparatus 410.

It should be noted that the successive folding apparatus 410 described above is not limited to the above embodiment. For example, a switch device provided on a contact position of the pressing plate 414a on the base 411 may be provided to detect a pressing action of the pressing plate 414a onto the flat cable F. This will prevent the operator from omitting the swinging action of the driving element 416, thereby surely folding the flat cable.

It will be apparent from the foregoing according to the present invention that since the flat cable positioned on the mounting table by the positioning unit is folded by the first direction-defining section and the folded portion is pressed by the pressing and securing unit, it is possible to enhance accuracies in dimension and operation at the first working position.

Since the flat cable secured to the mounting table by the pressing and securing unit is folded along the second direction-defining section and the folded portion is pressed by the pressing unit, it is possible to enhance accuracies in dimension and operation at the second working position.

Since the flat cable pressed at the first working position is secured to the mounting table by the pressing and securing unit, an operator can easily fold the flat cable at the second working position.

Accordingly, the present invention can enhance accuracies in dimension and operation and can proceed with a successive folding operation efficiently.

Figure 23A:
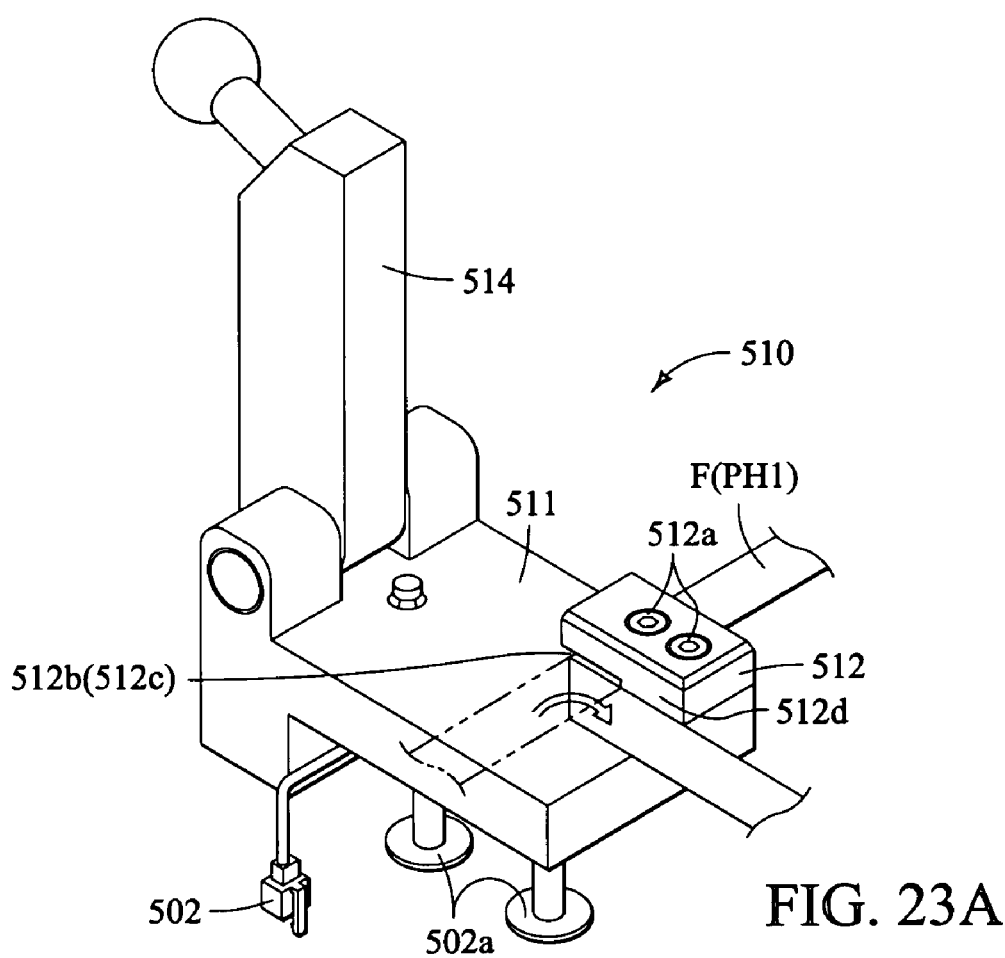
FIG. 23A is an enlarged perspective views of an apparatus for folding a flat cable according to a sixth embodiment of the present invention, illustrating the apparatus in a position before beginning a folding operation.

FIG. 23A is an enlarged perspective view of an apparatus 510 for folding a flat cable according to a sixth embodiment of the present invention. The sixth embodiment shown in FIG. 23A is substantially a mirror image of the fourth embodiment of the present invention shown in FIG. 13. FIG. 23A shows a position before the folding apparatus 510 is actuated and FIG. 23B shows a position after the folding apparatus 510 is actuated.

Referring to FIG. 23A, the folding apparatus 510 includes a base block 511. The base block 511 is secured to the drawing board body 502 by a supporting section 502a provided along an arrangement path PH of the flat cable F extending from the drawing board body 502. A positioning block 512, which holds the flat cable F on the arrangement path PH1, may be fixed on the base block 511 by a pair of bolts 512a. The positioning block 512 is provided with a cut-off portion 512b. A slot 512c is defined between the cut-off portion 512b and an upper surface of the base block 511. The flat cable F is contained laterally in the slot 512c, and is folded forwardly along a guide surface 512d of the positioning block 512.

Figure 23B:
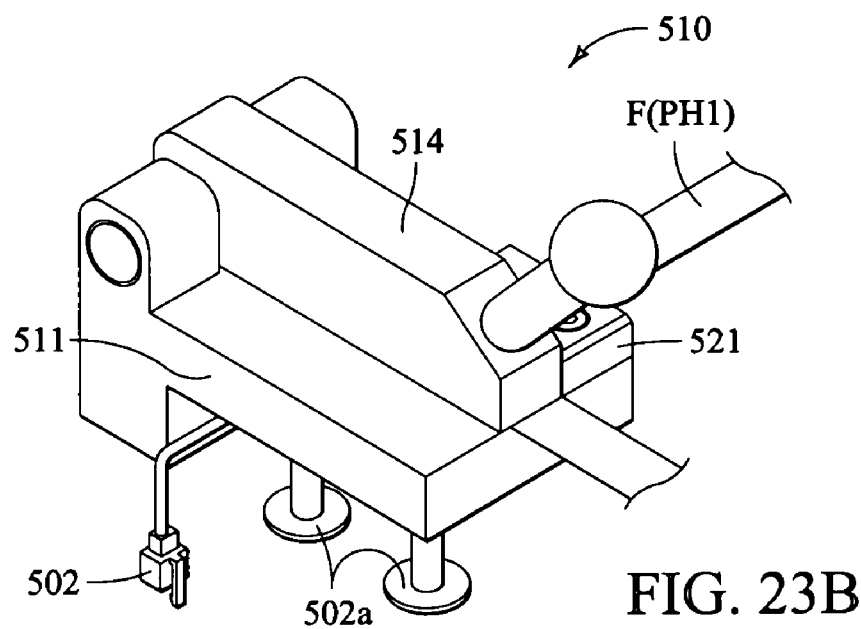
FIG. 23B is an enlarged perspective view of the apparatus for folding a flat cable according to the embodiment shown in FIG. 23A, illustrating the apparatus in a position after finishing the folding operation.

As shown in FIG. 23B, the folded flat cable F is pressed between the base block 511 and the driving block 514 at the folded portion by rotating the driving block 514 rotatably provided on the base block 511 to cause plastic deformation in the folded portion.

By using the folding apparatus 510 described above, the flat cable F is held on the drawing board and folded at the predetermined folding position.

Figure 24:
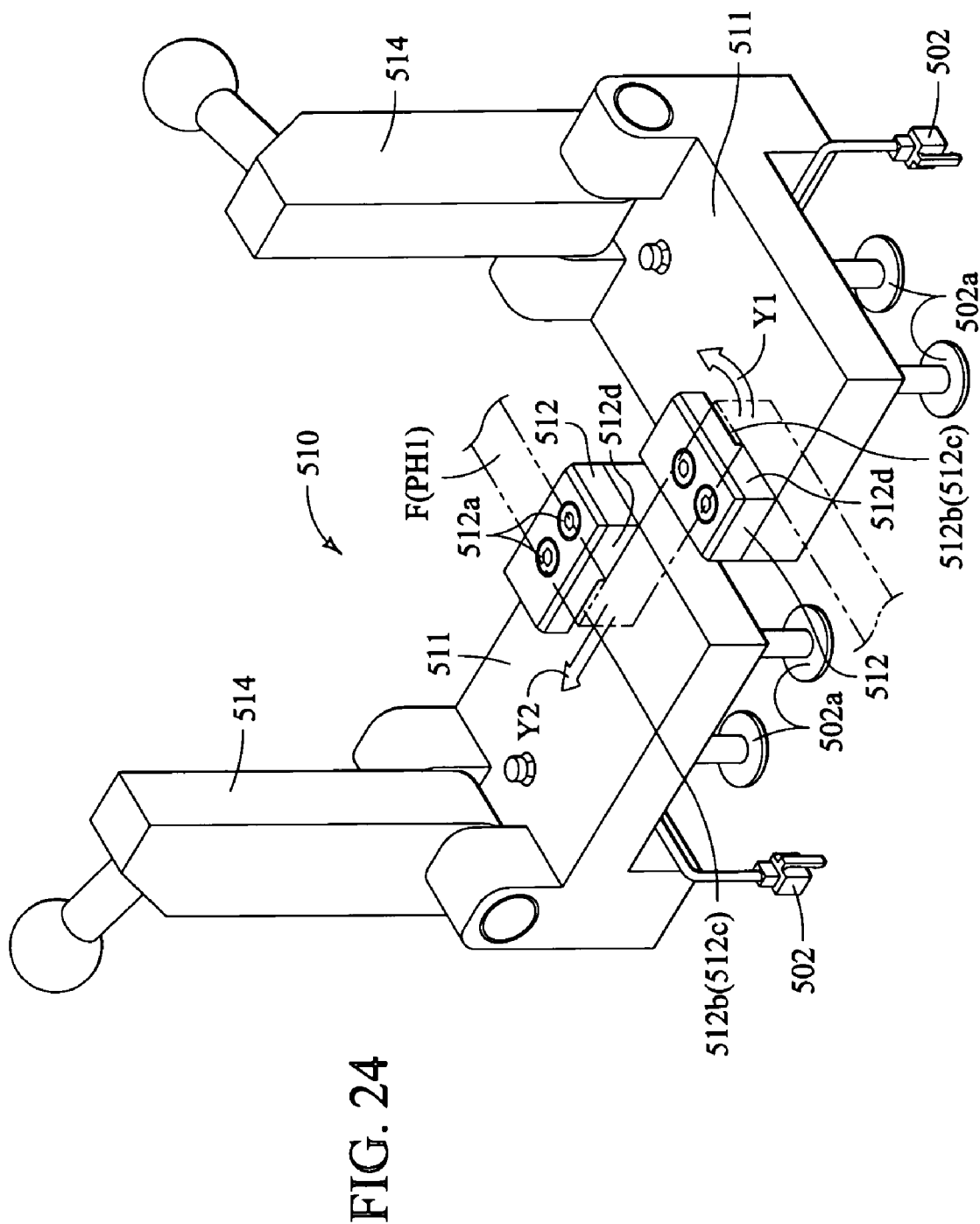
FIG. 24 is an enlarged perspective view of a plurality of folding apparatuses according to the embodiment shown in FIG. 23A provided to carry out a successive folding operation.

FIG. 24 is an enlarged perspective view of the folding apparatus 510 provided to carry out a successive folding operation.

Referring to FIG. 24, for example, in the case where the arrangement path PH1 turns toward the front and then successively turns to the left adjacent the turned front side position, the folding apparatus 510 is provided in each folding position on the arrangement path PH1. As described above, the flat cable F that is held in the slot 512c of one folding apparatus 510 is folded to a front side along the guide surface 512d of the positioning block 512. The folded flat cable F is contained in the slot 512c of the other folding apparatus 510 at the downstream side thereof and folded toward the left side along the guide surface 512d of the positioning block 512. The flat cable F, which is folded at the respective folding positions, is subject to plastic deformation in the respective creases by rotating the driving blocks 514 of the respective folding apparatuses 510.

The flat cable F folded above is folded along the arrangement path PH1 and held in the slots 512c in the respective folding apparatuses 510 while maintaining the folded shape. When the flat cable F is removed from the respective folding apparatuses 510 after it is folded, the driving blocks 514 of the respective folding apparatuses 510 are rotated to retract the blocks 514 above the base block 511. Then, by rotating one folded portion in the counter clockwise direction (a direction shown by an arrow Y1 in FIG. 24) about the other folded portion, the one folded portion is removed from the slot 512c. Then, the other folded portion is removed in a rearward direction (a direction shown by an arrow Y2 in FIG. 24).

Figure 25:
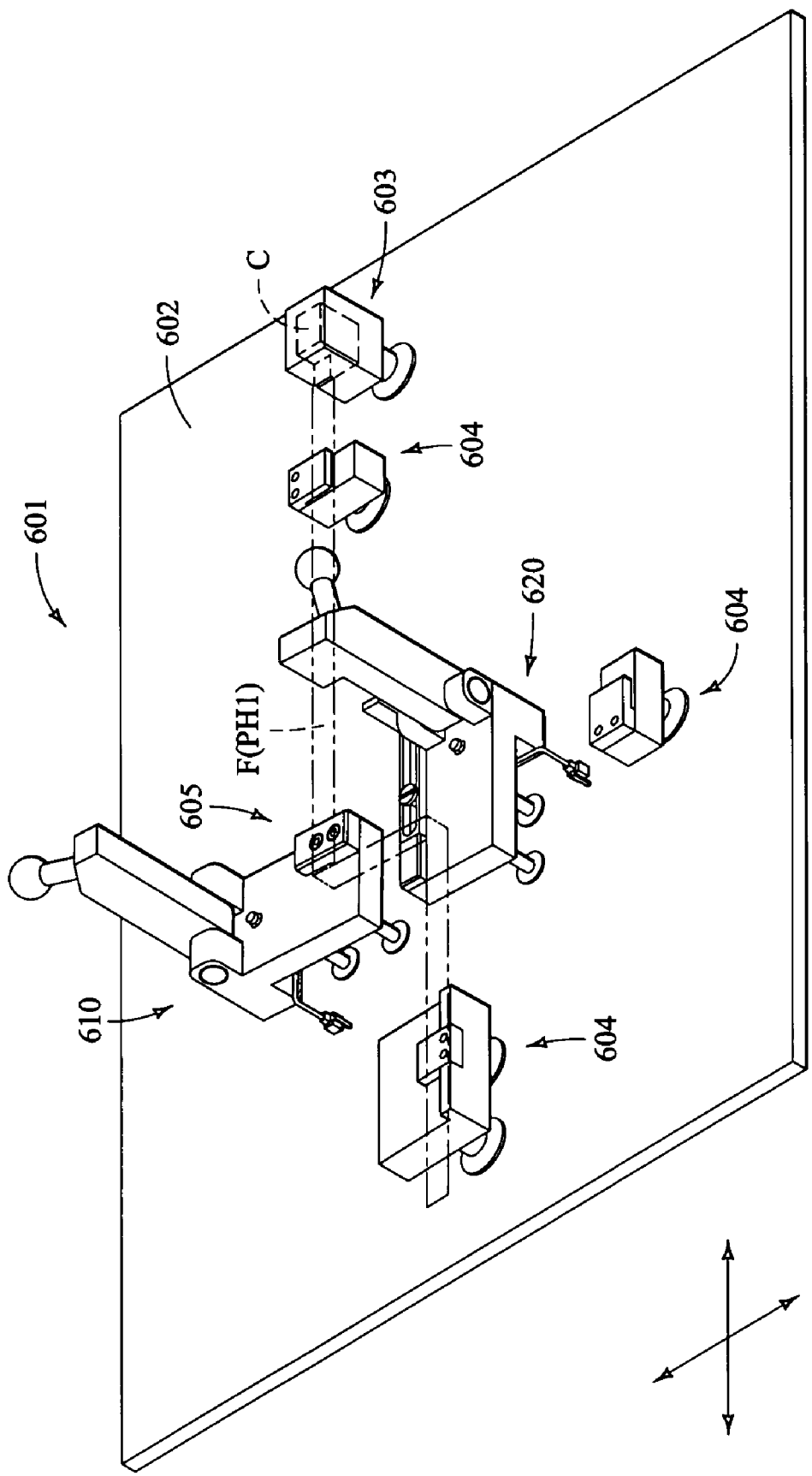
FIG. 25 is a schematic perspective view of a production drawing board for a flat cable in accordance with a seventh embodiment of the present invention.

FIG. 25 is a schematic perspective view of the seventh embodiment of a production drawing board 601 for a flat cable F in accordance with the present invention.

Referring to FIG. 25, the production drawing board 601 includes a drawing board body 602. The drawing board body 602 is an inclined working-table that an operator (not shown) can look down upon. The flat cable F is disposed along an arrangement path PH1 on the drawing board body 602. For convenience of explanation, the operator's side of the drawing board body 602 is defined as the "front side" and right and left sides in a longitudinal direction of the drawing board body 602 are defined as "right and left sides", respectively.

In the seventh embodiment, a connector C is connected to an end of the flat cable F and a connector holder 603 is provided at a position corresponding to the connector C on the arrangement path PH1 on the drawing board body 602. A plurality of relay holding members 604 are provided on positions corresponding to the arrangement path PH1 on the drawing board body 602.

Figure 26:
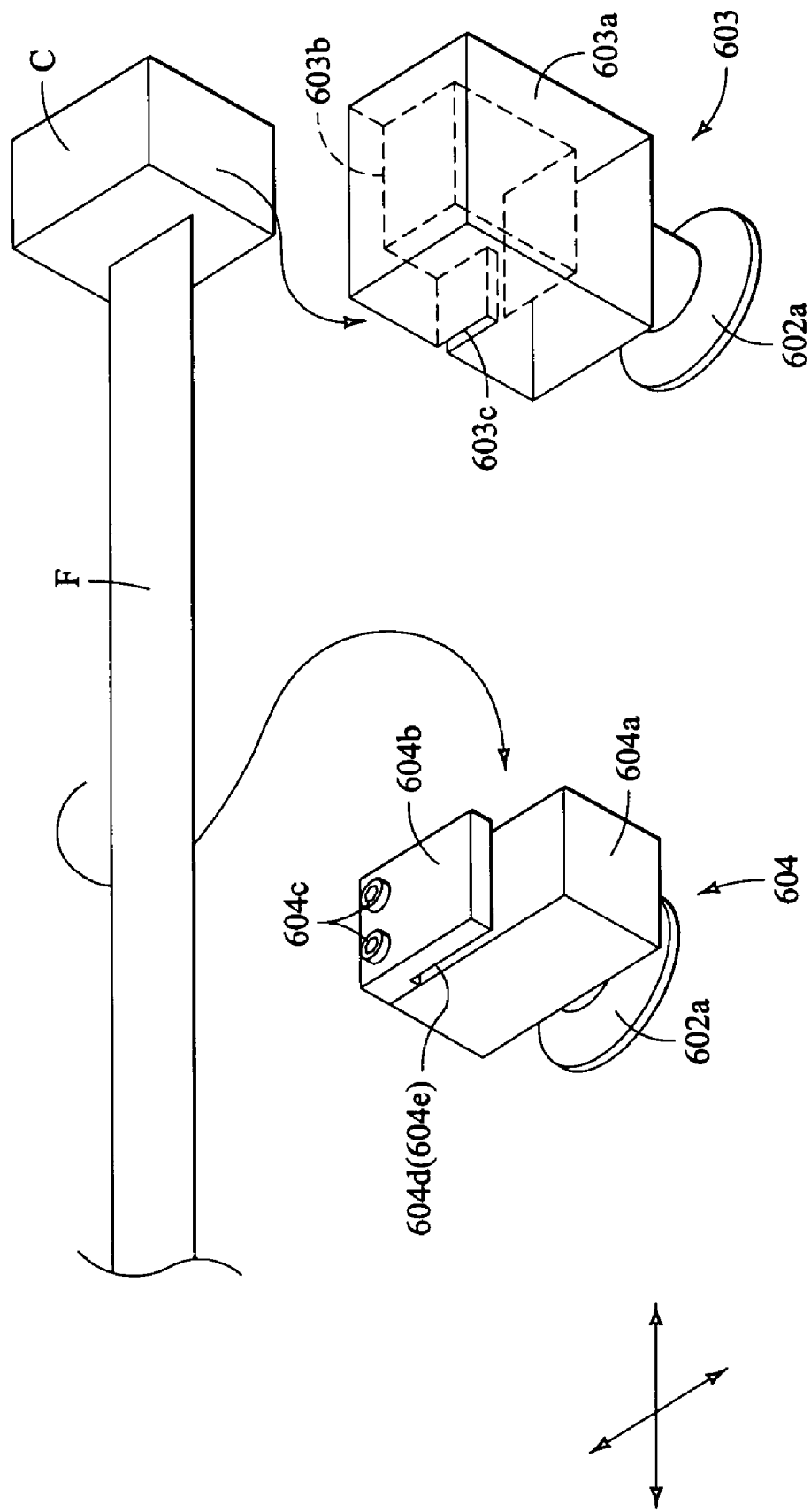
FIG. 26 is a schematic perspective view of a connector holder and a relay holding member on the production drawing board of the embodiment shown in FIG. 25.

FIG. 26 is a schematic perspective view of the connector holder 603 and relay holding member 604 on the producing drawing board 601.

Referring to FIGS. 25 and 26, the connector holder 603 includes a holder block 603a. The holder block 603a is configured as a substantially rectangular body and may be a solid body. The holder block 603a may be made of any suitable material such as, for example, a synthetic resin material or the like. The holder block 603a may be secured to the drawing board body 602 by a supporting pole 602a extending from the drawing board body 602. The holder block 603a is provided with a containing hole 603b for accommodating the connector C. The containing hole 603b is open toward the right side and the rear side so that the connector C can be detachably inserted therein. Moreover, the holder block 603a is provided with a containing groove 603c that extends from the left side surface to the containing hole 603b. The containing groove 603c is open at the rear thereof and extends in the right and left side directions. The width and depth of the containing groove 603c are determined in accordance with the thickness and width of the flat cable F to contain the flat cable F in the groove 603c. When the connector C is attached to the connector holder 603 from the rear, the flat cable F connected to the connector C is accommodated in the containing groove 603c. In the present embodiment, since the flat cable F is arranged from the side of the connector C, the side of the connector C on the arranged flat cable F is hereinafter defined to be as an "upstream side".

The relay holding member 604 is provided on a downstream side of the connector holder 603 and includes a base block 604a. The base block 604a is a substantially rectangular body and may be a solid body. The base block 604a may be made of any suitable material such as, for example, of a synthetic resin material or the like. The base block 604a may be secured to the drawing board body 602 by any suitable securing device and in the present embodiment is secured to the drawing board body 602 by the supporting pole 602a extending from the drawing board body 602. A holding block 604b is secured to an upper surface of the base block 604a by any suitable securing device and in the present embodiment is secured to the upper surface of the base block 604a by a pair of bolts 604c. The holding block 604b is a planar element and may be made of any suitable material such as, for example, a transparent synthetic resin material or the like. The holding block 604b is provided on the bottom surface thereof with a cut-off portion 604d. The cut-off portion 604d and upper surface of the base block 604a define a slot 604e. The slot 604e is open in the front and extends in the right and left directions. The width and depth of the slot 604e are determined in accordance with the thickness and width of the flat cable F to contain the flat cable F in the slot 604e. The relay holding member 604 contains the flat cable F from the front along the arrangement path PH1 on the drawing board body 602.

The flat cable F is disposed along the arrangement path PH1 on the drawing board body 602 by the connector holder 603 and holding member 604 described above. In the present embodiment, the arrangement path PH1 is determined to turn toward the front downstream of the connector holder 603 (a position where the flat cable F is folded is hereinafter referred to a "first folding position") and to turn toward the left side at a position downstream of the connector holder 603 (a position where the flat cable F is folded is hereinafter referred to a "second folding position"). That is, successive folding positions are set on the drawing board body 602 and a holding assembly unit 605 is arranged at positions corresponding to the successive folding positions on the drawing board body 602.

Figure 27:
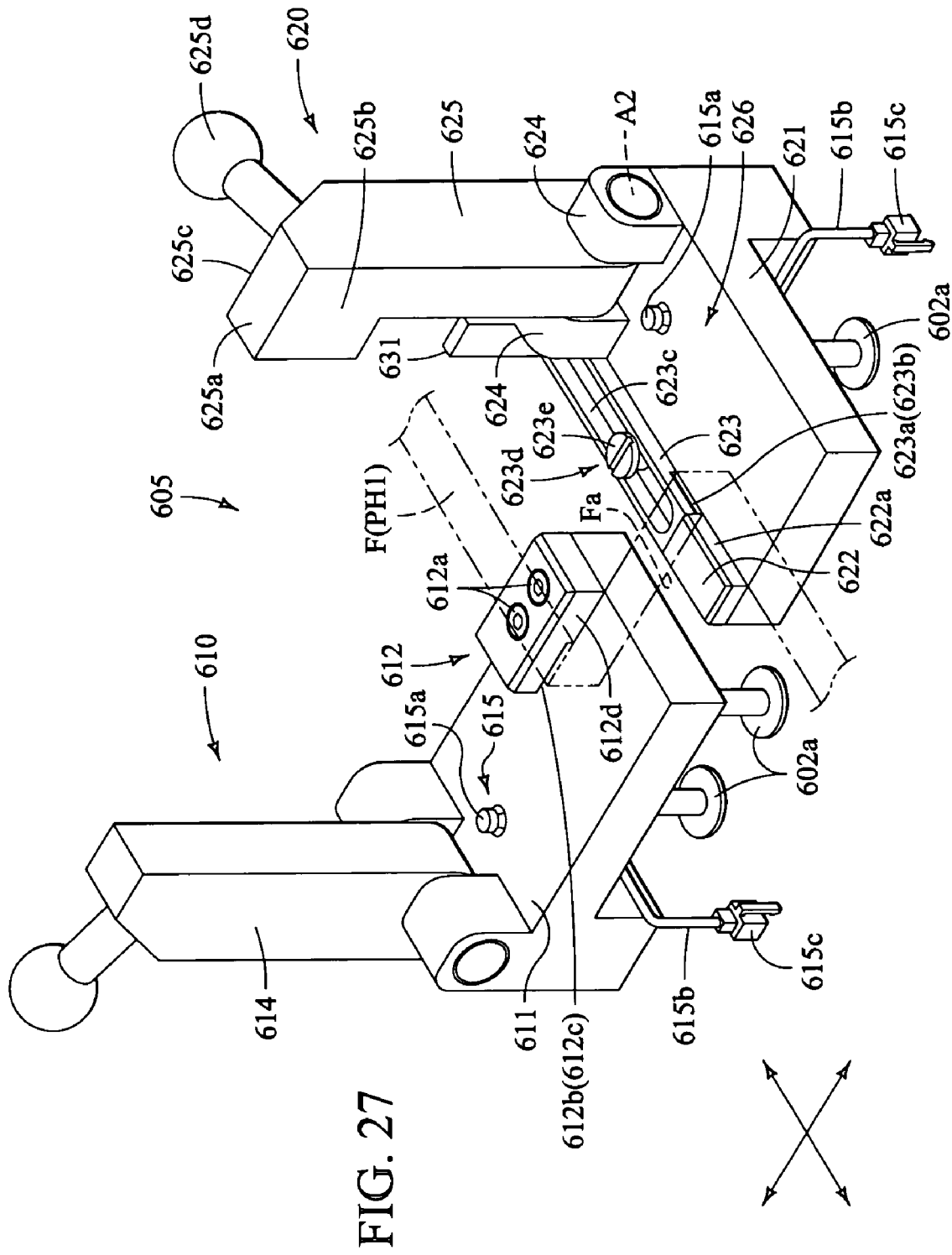
FIG. 27 is an enlarged perspective view of a cable-holding assembly on the production drawing block of the embodiment shown in FIG. 25.

FIG. 27 is an enlarged perspective view of the holding assembly unit 605 on the production drawing board 601 shown in FIG. 25.

Referring to FIGS. 25 and 27, the holding assembly unit 605 includes the folding apparatus 610 disposed at the position corresponding to the first folding position on the drawing board body 602. As described above, the folding apparatus 610 includes a slot 612c, positions the flat cable F on the arrangement path PH1 on the drawing board body 602, and folds the flat cable F at the first folding position.

A first switch 615 is provided at a position where the switch 615 comes into contact with a driving block 614 on the holding base 611. The first switch 615 includes a sleeve (not shown) fixed in the holding base 611. A movable pin 615a is inserted in the fixed sleeve and is slidable up and down therein. The movable pin 615a projects upwardly from the holding base 611. When the driving block 614 presses the movable pin 615a, the pin 615a is moved to the position aligned with the upper surface of the holding base 611. Then, the first switch 615 is brought into contact with an electric contact (not shown) to generate a given electric signal (hereinafter referred to a "ON position"). The electric signal is transmitted to a well known inspection apparatus (not shown) through an electric wire 615b an end of which is connected to a lower end of the fixed sleeve and through a connector 615c connected to the other end of the electric wire 615b.

As described above, the flat cable F is folded forwardly at the first folding position by the folding apparatus 610 while the folded flat cable F is disposed on a cable-holding assembly 620.

The cable-holding assembly 620 is provided at a position corresponding to the second folding position on the arrangement path PH1 on the drawing board body 602. The cable-holding assembly 620 includes a mounting table 621. The mounting table 621 is a substantially rectangular plate and may be made of any suitable material such as, for example, a metallic material or the like. The mounting table 621 may secured to the drawing board body 602 by supporting poles 602a (only one is shown in the drawing) extending from the drawing board body 602.

The mounting table 621 is provided on a left rear end thereof with a restraining block 622. The restraining block 622 is a substantially rectangular body and may be solid. The restraining block 622 may be made of any suitable material such as, for example, a metallic material or the like. The flat cable F folded by the folding apparatus 610 is provided on the mounting table 621 so that a left side edge of the flat cable F comes into contact with a right side surface of the restraining block 622 and a bottom side of the flat cable F comes into contact with an upper surface of the mounting table 621. That is, the flat cable F is disposed on the mounting table 621 with the flat cable F being restrained from moving to the second folding position. In the present embodiment, a front surface of the restraining block 622 serves as an indicating surface 622a or a direction-defining section that defines the second folding direction of the flat cable F in association with a holding member 623 described below.

The mounting table 621 is provided with the holding member 623 extending toward the right from the restraining block 622. The holding member 623 is a substantially rectangular plate and may be made of any suitable material such as, for example, a metallic material. The holding member 623 is provided on a left bottom surface thereof with a cut-off portion 623a which is open toward the front side, a left side, a rear side, and a lower side. A containing section 623b is defined by the cut-off portion 623a, an upper surface of the mounting table 621, and a right side surface of the restraining block 622. The containing section 623b accommodates the flat cable F folded by the folding apparatus 610. The holding member 623 is provided on the mounting table 621 so that the member 623 covers the flat cable F disposed on the mounting table 621 and restrains the flat cable F from moving in the right and left directions and vertically up and down.

The holding member 623 is provided on a substantially central portion thereof with respect to its front and rear sides with a slider slot 623c extending in the right and left directions. A bolt 623d fixed on the mounting table 621 enters the slider slot 623c so that a bottom surface of a head 623e of the bolt 623d comes into contact with an upper surface of the holding member 623. The holding member 623 is restrained from moving upwardly but it can move in the right and left directions on the mounting table 621 between a position where the holding member 623 covers the front side of the flat cable F disposed on the mounting table 621 (hereinafter referred to as a "holding position") and a right side position where the holding member 623 is retracted from the front side of the flat cable F (hereinafter referred to a "detachable position").

Further, an actuating element 623f stands on a right end of the holding member 623. When an operator moves the actuating element 623f to the right and left, the holding member 623 moves between the holding position and the detachable position.

A pair of front and rear supporting sections 624 stand on the right end of the mounting table 621. The front supporting section 624 is provided on the front end of the mounting table 621 while the rear supporting section 624 is provided on the rear end of the holding member 623. Both supporting sections 624 support an axle A2 extending in the front and rear directions. A proximal end of a pressing block or pressing device 625 is supported rotatably on the axle A2 between the supporting sections 624. The pressing block 625 is a substantially rectangular body and may be solid. The pressing block 625 may be made of any suitable material such as, for example, a metallic material or the like. A pressing projection 625a extends rearwardly from a distal end of the pressing block 625. When the pressing block 625 is rotated about the axle A2, the bottom surfaces of the pressing block 625 and pressing projection 625a come into contact with the upper surface of the mounting table 621 to serve as a pressing surface 625b.

The pressing block 625 is provided on a distal end thereof with a chamfered portion 625c. The chamfered portion 625c is provided with a handle 625d extending in a normal direction.

A second switch 626 is provided at a position where it comes into contact with the pressing surface 625d on the mounting table 621. Since the second switch 626 has the same structure as that of the first switch 615, an explanation of the second switch is omitted here.

FIGS. 28 to 31 are plan views of the holding assembly unit 605 shown in FIG. 27, illustrating an operation of the unit 605.

Figure 28:
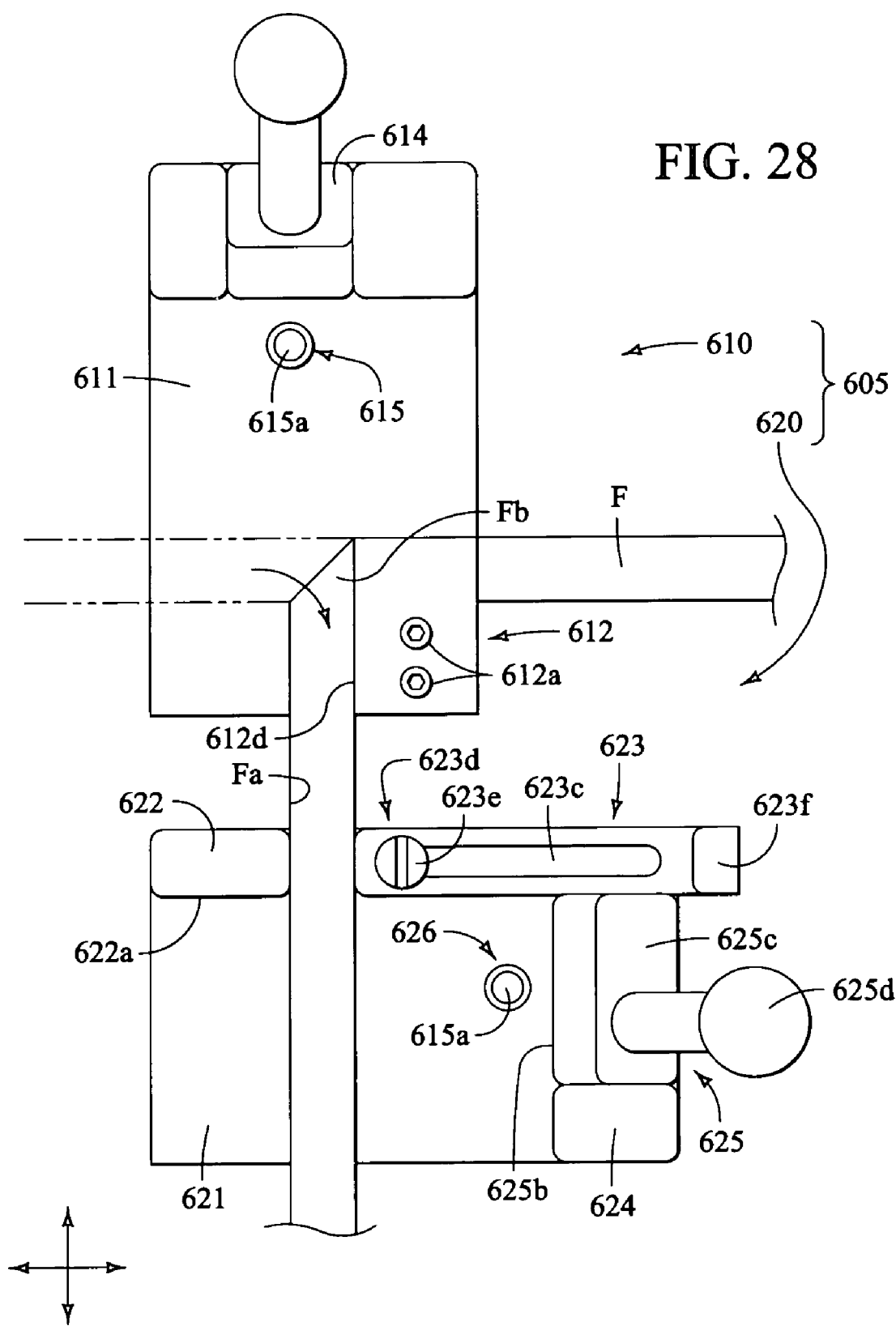
FIG. 28 is a plan view of the cable-holding assembly shown in FIG. 27, illustrating a folding operation.

Referring to FIG. 28, the operator inserts the flat cable F into the slot 612c (see FIG. 27) of the folding apparatus 610 (the slot-inserting step). Then, the operator folds the flat cable F along the guide surface 612d to form a first folded portion Fb (the first folding step). The operator rotates the driving block 614 with the first folded portion Fb being kept in the folding position.

Figure 29:
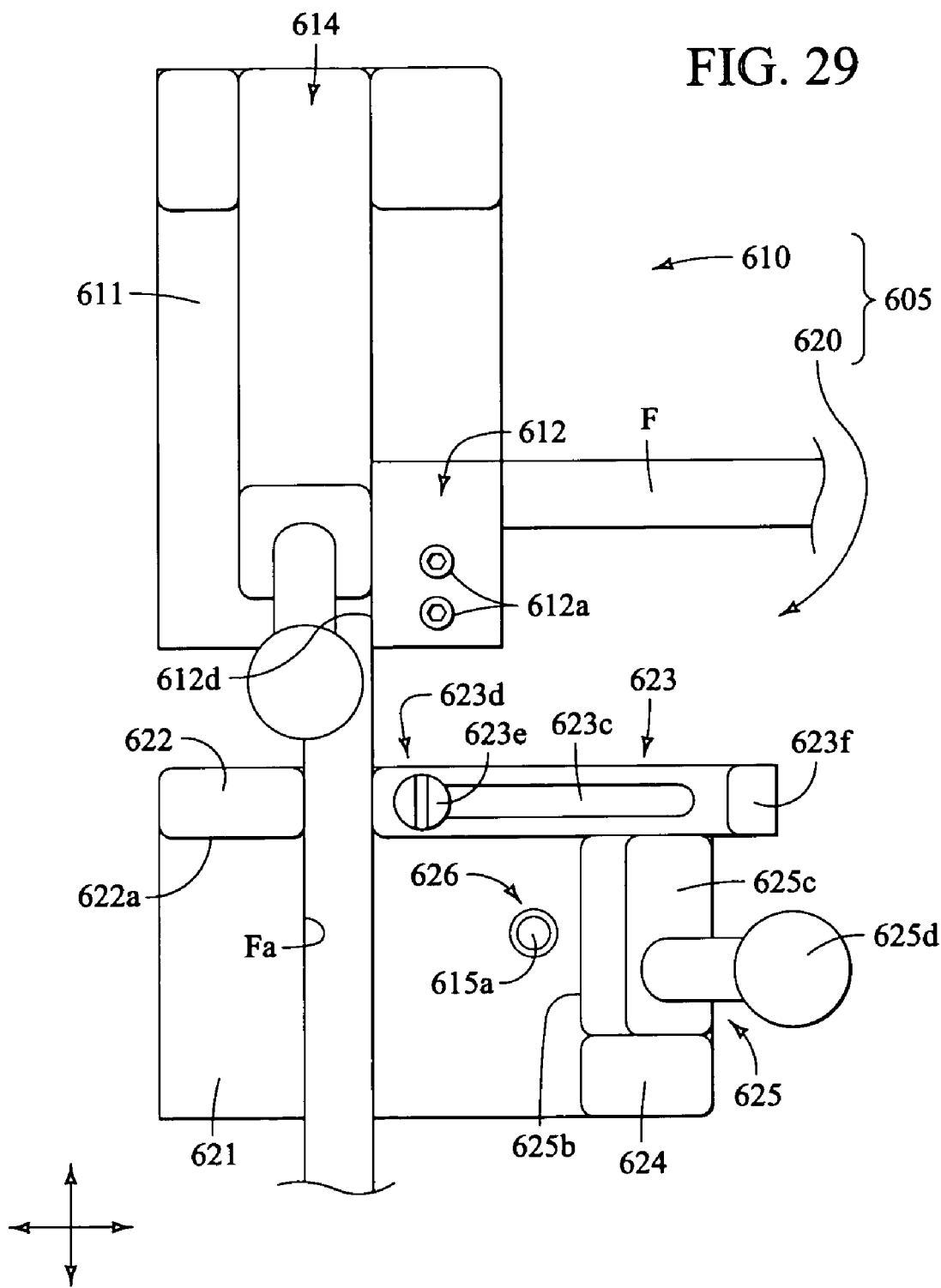
FIG. 29 is a plan view of the cable-holding assembly shown in FIG. 27, illustrating a folding operation.
Figure 30:
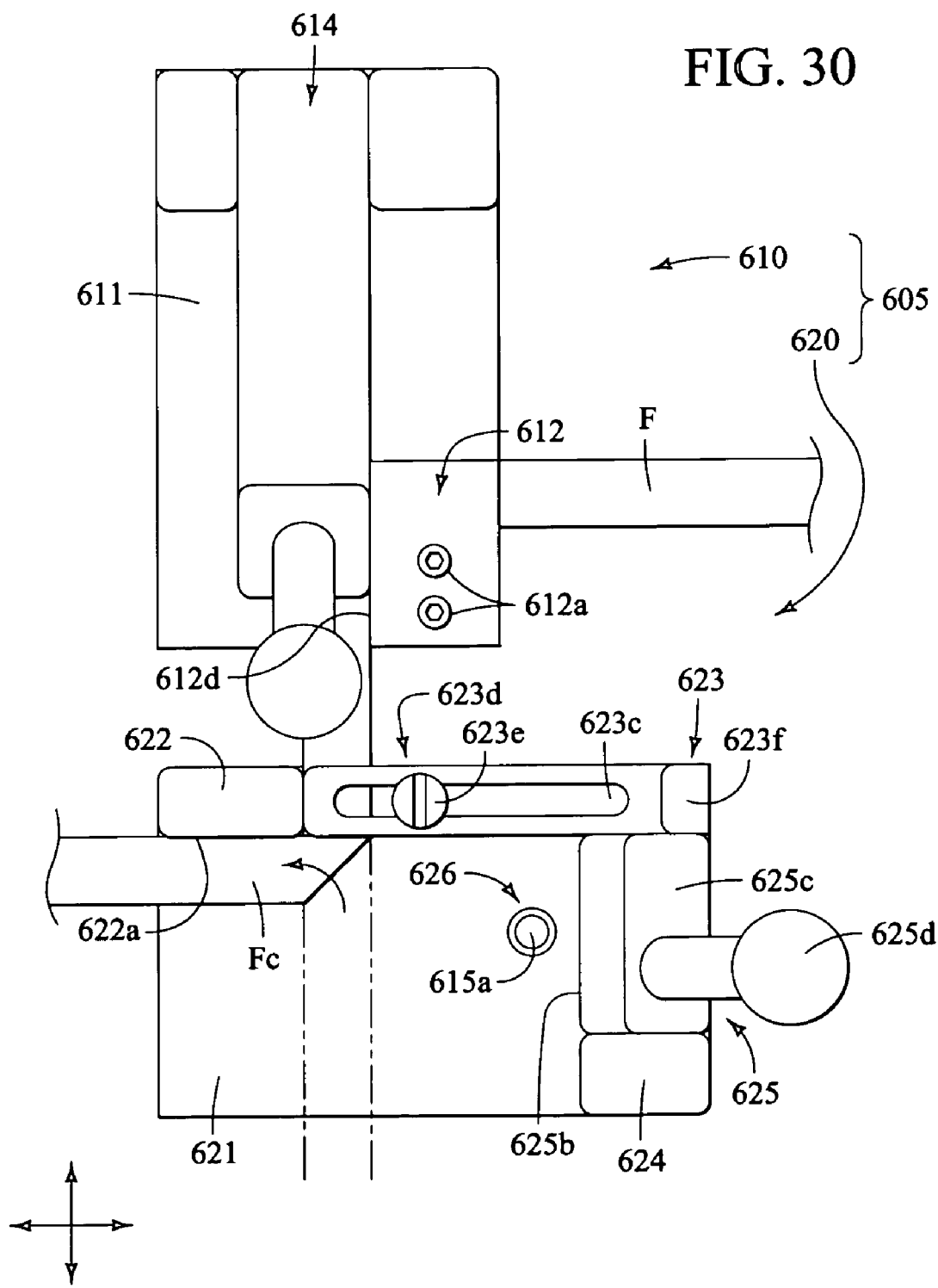
FIG. 30 is a plan view of the cable-holding assembly shown in FIG. 27, illustrating a folding operation.

Referring to FIG. 29, when the driving block 614 is rotated, the first folded portion Fb is pressed between the driving block 614 and the holding base 611 to cause plastic deformation in the portion Fb (the first pressing step). Then, the operator positions the flat cable F on the mounting table 621 of the cable-holding assembly 620 with a left side Fa of the flat cable F at the downstream side from the first folded portion Fb coming into contact with the right side surface of the restraining block 622 (the mounting step). The operator moves the holding piece 623 to the holding position (the holding step). Consequently, as shown in FIG. 30, the front side of the flat cable F is covered with the holding piece 623 and the flat cable F is restrained from moving in a direction opposite from the second folding position. Under this condition, the operator folds the flat cable F along the indicating surface 622a to form a second folded portion Fc (the second folding step). Then, the operator grasps the handle 625d while maintaining the second folded portion Fc and rotates the pressing block 625.

Figure 31:
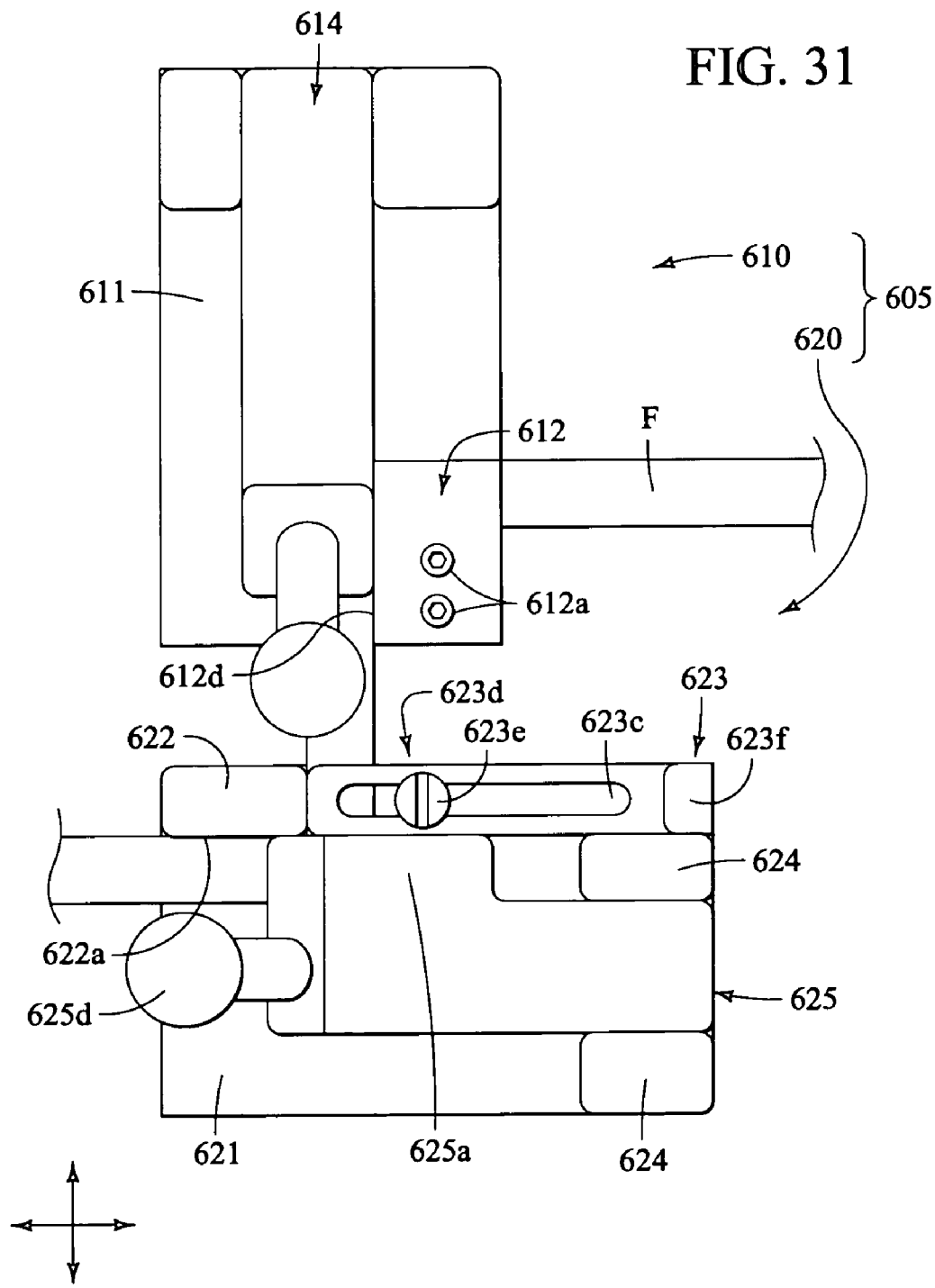
FIG. 31 is a plan view of the cable-holding assembly shown in FIG. 27, illustrating a folding operation.

Referring to FIG. 31, when the pressing block 625 is rotated, the second folded portion Fc is pressed between the pressing surface 625b of the pressing block 625 and the mounting table 621 to cause plastic deformation in the folded portion Fc (the second pressing step). Under this condition, the pressing block 625 is disposed at the pressing position.

The first switch 615 in the position shown in FIG. 29 and the second switch 626 in the position shown in FIG. 30 are turned to an ON condition by the driving block 614 and pressing block 625, respectively. The inspection apparatus detects whether the respective operations are completed in response to the electric signals from the first and second switches 615 and 626. If the inspection apparatus detects the completion of the operation, it informs the operator.

Thus, the folding apparatus 610 and cable-holding assembly 620 can fold the flat cable F at the first and second folding position. The folded flat cable F is removed from the cable-holding assembly 620 by rotating the pressing block 625 from the pressing position to space the block 625 away from the flat cable F (that is, a position shown in FIGS. 28 to 30; hereinafter referred to a "spaced position") and by displacing the holding member 623 to the detachable position (the releasing step). The flat cable F removed from the second cable-holding assembly can be removed rearwardly from the slot 12c in the folding apparatus 610 by rotating the driving block 614 of the folding apparatus 610 to the position shown in FIG. 26.

It should be noted that the folding positions of the flat cable F are not limited to the first and second folding positions mentioned above. If there are plural folding positions, the folding apparatuses and cable-holding assemblies may be disposed alternately at successive folding positions. At least the folding apparatus 610 may be provided at a single position and the cable-holding assemblies 620 may be provided at other positions.

Although the folding apparatuses 610 and cable-holding assemblies are arranged alternately at the first and second folding positions in the above embodiment, they are not limited to this arrangement. For example, if the cable-holding assemblies 620 are provided at the first and second folding positions, the flat cable F is folded at the first and second folding positions by holding the flat cable F by the respective holding member 623, folding the flat cable F along the respective indicating surface 622a, and setting the respective pressing blocks 625 at the pressing positions. After folding the flat cable F, it can be easily removed from the second cable-holding assembly by rotating the pressing blocks 625 to the spaced positions and setting the holding members 623 at the detachable positions.

Moreover, although the cable-holding assembly 620 is set at the detachable position by displacing the holding piece 623 to the right in the above embodiment, the present invention is not limited to this embodiment. For example, the flat cable F may be drawn out by setting the holding piece 623 to be rotatable with respect to the mounting table 621 in the same manner as the pressing block 625 and by releasing the upper surface of the flat cable F by rotating the holding piece 623.

The holing assembly unit 605 as constructed above includes the folding apparatus 610 at the first folding position on the arrangement path of the flat cable F. The flat cable F is held and folded in the first folding direction by the slot 612c and guide surface 612d of the folding apparatus 610. The folded flat cable F is provided on the mounting table 621 of the cable-holding assembly 620 and is held by the holding piece 623 displaced to the holding position. Since the flat cable F is restrained from moving toward the right and left directions and upper and lower directions under this condition, the flat cable F is stably held. The held flat cable F is folded to the second folding direction by the holding member 623 and indicating surface 622a. Plastic deformation is caused in the flat cable by rotating the pressing block 625 to the pressing position.

The flat cable F, which is folded at the first and second folding positions, can be removed from the cable-holding assembly 620 by rotating the pressing block 625 of the cable-holding assembly 620 to the spaced position and setting the holding piece 623 at the detachable position. The flat cable F, which is removed from the cable-holding assembly 620, is removed rearwardly from the slot 612c in the folding apparatus 610.

Accordingly, the cable-holding assembly can be used preferably in the method for successively folding the flat cable F to hold and fold the flat cable F on the arrangement path PH1 on the drawing board stably and to easily insert and remove the flat cable F into and from the assembly 620 without breaking the flat cable F.

It will be apparent from the foregoing according to the present invention that the flat cable can be folded to the predetermined first and second folding directions and can be held along the arrangement path by the slot and cable-holding assembly. Since the cable-holding assembly is provided with the holding member that can move relative to the mounting table, the flat cable is restrained from moving by the mounting table, restraining section, and holding piece when the holding piece is displaced to the holding position, thereby stably holding the flat cable along the arrangement path.

Further, cable-holding assembly is released by displacing the holding piece to the detachable position and the flat cable is easily removed from the cable-holding assembly without breaking the flat cable. Consequently, the flat cable can be easily removed from the slot.

Since the cable-holding assembly is provided with the pressing device movable relative to the mounting table, the flat cable folded along the direction-defining section can be subject to plastic deformation.

Accordingly, the cable-holding assembly according to the present invention can hold and fold the flat cable on the predetermined arrangement path stably and can insert and remove the flat cable into and from the cable-holding assembly without breaking the flat cable after successively folding the flat cable in the case of disposing the flat cable on the successively folding positions.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in prior Japanese Application Nos. JP 2001-259523, filed on Aug. 29, 2001; JP 2002-138912, filed on May 14, 2002; JP 2002-148007, filed on May 22, 2002; and JP 2002-164110, filed on Jun. 5, 2002, which are herein expressly incorporated by reference in their entireties.

What is claimed is:

1. An apparatus for folding a flat cable having a connector on an end thereof to arrange the flat cable in a pattern, said apparatus comprising:

a drawing board for arranging a flat cable thereon, an arrangement path of the flat cable being defined on said drawing board;

a connector holder provided on said drawing board that detachably holds the connector attached to the flat cable at a connector holding position defined on said arrangement path; and a plurality of cable folding members provided on said drawing board at folding positions of the flat cable defined on said arrangement path, each said cable folding member including a positioning element for positioning the flat cable on said arrangement path and a direction defining portion for defining a folding angle of the flat cable in association with said positioning element.

2. The apparatus for folding a flat cable according to claim 1, wherein said direction defining portion is formed on an outer wall of said positioning element, and wherein said direction defining portion includes a guide surface that extends in a direction intersecting a longitudinal direction of the flat cable defined by said positioning element at said folding angle and guides an edge of the folded portion of the flat cable.

3. The apparatus for folding a flat cable according to claim 1, further comprising:

a cable pinching member that pinches a portion of the flat cable having a crease folded by said cable folding member to cause plastic deformation of the flat cable in the crease.

* * * * *